(12) United States Patent
Kim et al.

(10) Patent No.: US 11,507,250 B2
(45) Date of Patent: Nov. 22, 2022

(54) ELECTRONIC DEVICE INCLUDING FLEXIBLE DISPLAY AND METHOD FOR OPERATING SCREEN OF ELECTRONIC DEVICE

(71) Applicant: Samsung Electronics Co., Ltd., Gyeonggi-do (KR)

(72) Inventors: Raetae Kim, Gyeonggi-do (KR); Youngseong Kim, Gyeonggi-do (KR); Wankyu Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/324,268

(22) Filed: May 19, 2021

(65) Prior Publication Data

US 2022/0121346 A1    Apr. 21, 2022

(30) Foreign Application Priority Data

Oct. 15, 2020    (KR) ........................ 10-2020-0133755

(51) Int. Cl.
  G06F 3/04817    (2022.01)
  G09G 3/00    (2006.01)
  G06F 1/16    (2006.01)

(52) U.S. Cl.
  CPC ......... *G06F 3/04817* (2013.01); *G09G 3/035* (2020.08); *G06F 1/1652* (2013.01);
  (Continued)

(58) Field of Classification Search
  None
  See application file for complete search history.

(56) References Cited

U.S. PATENT DOCUMENTS 9,383,775 B2    7/2016   Cho et al.
2008/0144265 A1*  6/2008   Aoki ................... H04M 1/0268
                            361/679.04
(Continued)

FOREIGN PATENT DOCUMENTS

KR    10-2014-0125243 A    10/2014
KR    10-2014-0135404 A    11/2014
(Continued)

OTHER PUBLICATIONS

Korean Search Report dated Dec. 30, 2020.
Korean Search Report dated Feb. 2, 2021.
Korean Search Report dated Mar. 10, 2021.

*Primary Examiner* — David H Chu
(74) *Attorney, Agent, or Firm* — Cha & Reiter, LLC

(57) ABSTRACT

An electronic device may include: a housing; a flexible display which can be slid out from an inner space of the housing; and a processor, wherein the processor is configured to: control a first screen operation on the flexible display having a first size; determine whether the flexible display is slid out; control a second screen operation on the flexible display having a second size when the flexible display is slid out; and control the second screen operation such that a first page displayed during the first screen operation and at least some of icons included on a second page are displayed, and a user interface is displayed to allow the at least some of icons included on the second page to be distinguished from the first page.

18 Claims, 47 Drawing Sheets

(52) U.S. Cl.
CPC . *G09G 2340/0442* (2013.01); *G09G 2354/00* (2013.01); *G09G 2380/02* (2013.01)

(56) References Cited

U.S. PATENT DOCUMENTS

| | | | | |
|---|---|---|---|---|
| 2010/0117975 | A1* | 5/2010 | Cho | G06F 1/1626 |
| | | | | 345/173 |
| 2013/0234951 | A1 | 9/2013 | Kim et al. | |
| 2013/0321340 | A1* | 12/2013 | Seo | G06F 3/1438 |
| | | | | 345/174 |
| 2014/0015743 | A1* | 1/2014 | Seo | G09G 3/035 |
| | | | | 345/156 |
| 2014/0137041 | A1* | 5/2014 | Jeon | G06F 1/1652 |
| | | | | 715/815 |
| 2014/0313137 | A1* | 10/2014 | Cho | G06F 3/0488 |
| | | | | 345/173 |
| 2014/0340299 | A1* | 11/2014 | Lee | G06F 1/1652 |
| | | | | 345/156 |
| 2015/0286352 | A1 | 10/2015 | Gu | |
| 2016/0033999 | A1* | 2/2016 | Browning | G06F 1/1622 |
| | | | | 345/667 |
| 2016/0147362 | A1* | 5/2016 | Eim | G06F 3/0416 |
| | | | | 345/173 |
| 2016/0188162 | A1* | 6/2016 | Lee | G06F 3/013 |
| | | | | 715/788 |
| 2016/0349971 | A1* | 12/2016 | Chi | G06F 3/04845 |
| 2016/0378270 | A1* | 12/2016 | Lee | G06F 3/0481 |
| | | | | 715/788 |
| 2017/0011714 | A1* | 1/2017 | Eim | G06F 1/1677 |
| 2017/0147189 | A1* | 5/2017 | Ryu | G06F 3/04845 |
| 2017/0154609 | A1* | 6/2017 | Yoon | G09G 5/38 |
| 2018/0081398 | A1* | 3/2018 | Shin | G09G 5/005 |
| 2018/0364827 | A1* | 12/2018 | Chung | H04M 1/0268 |
| 2019/0012008 | A1* | 1/2019 | Yoon | H04M 1/725 |
| 2019/0235687 | A1* | 8/2019 | Nam | G06F 3/041 |
| 2021/0286510 | A1* | 9/2021 | Tyler | G06F 3/0483 |

FOREIGN PATENT DOCUMENTS

| | | |
|---|---|---|
| KR | 10-2016-0139320 A | 12/2016 |
| KR | 10-2016-0141838 A | 12/2016 |
| KR | 10-2017-0000553 A | 1/2017 |
| KR | 10-2017-0060519 A | 6/2017 |
| KR | 10-2434865 B1 | 8/2022 |

\* cited by examiner

<701>

<702>

<707>

<708>

<901>

<902>

<903>

<904>

<1001>

<1002>

<1003>

<1004>

ELECTRONIC DEVICE INCLUDING FLEXIBLE DISPLAY AND METHOD FOR OPERATING SCREEN OF ELECTRONIC DEVICE

CROSS-REFERENCE TO RELATED APPLICATION(S)

This application is based on and claims priority under 35 U.S.C. 119 to Korean Patent Application No. 10-2020-0133755, filed on Oct. 15, 2020, in the Korean Intellectual Property Office, the disclosure of which is herein incorporated by reference in its entirety.

BACKGROUND

1) Field

One or more embodiments disclosed herein generally relate to an electronic device including a flexible display and a method for operating a screen of the electronic device.

2) Description of Related Art

As digital technologies have developed, electronic devices of various types have been introduced into the market, including smartphones, tablet personal computers, and personal digital assistants (PDAs). Electronic devices tend to be designed to have portable sizes to be graspable by user's hands. At the same time, users have also demanded larger screens.

An electronic device may be implemented with, for example, a rollable screen that can be slid outwards. For example, a part of the flexible display may be drawn or slid out of the inner space of the electronic device, thereby expanding the screen.

The above information is presented as background information only to assist with an understanding of the disclosure. No determination has been made, and no assertion is made, as to whether any of the above might be applicable as prior art with regard to the disclosure.

SUMMARY

One or more embodiments disclosed herein related to an electronic device including a flexible display and a method for operating a screen of the electronic device. More particularly, one or more embodiments may relate to a method for operating an app list and/or an icon list, based on a display expansion state.

An electronic device according to certain embodiments may include: a housing; a flexible display which can be slid out from an inner space of the housing; and a processor, wherein the processor is configured to: control a first screen operation on the flexible display having a first size; determine whether the flexible display is slid out; control a second screen operation on the flexible display having a second size when the flexible display is slid out; and control the second screen operation such that at least some of icons included on a first page displayed during the first screen operation and a second page are displayed, and a user interface is displayed to distinguish at least some of the icons included on the first page and the second page.

A method for operating a screen of an electronic device including a flexible display which can be slid out from an inner space of a housing device according to certain embodiments may include: controlling a first screen operation on the flexible display having a first size; determining whether the flexible display is slid out; and control a second screen operation on the flexible display having a second size when the flexible display is slid out, wherein the second screen operation is controlled such that at least some of icons included on a first page displayed during the first screen operation and a second page are displayed, and a user interface is displayed to distinguish at least some of the icons included on the first page and the second page.

Additional aspects will be set forth in part in the description which follows and, in part, will be apparent from the description, or may be learned by practice of the presented embodiments.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

One or more embodiments disclosed herein may be advantageous in that, if the screen is slide out or expanded, a user interface related to the expanded area is provided such that the user can intuitively use the screen that is displayed in the expanded area.

Figure 1:
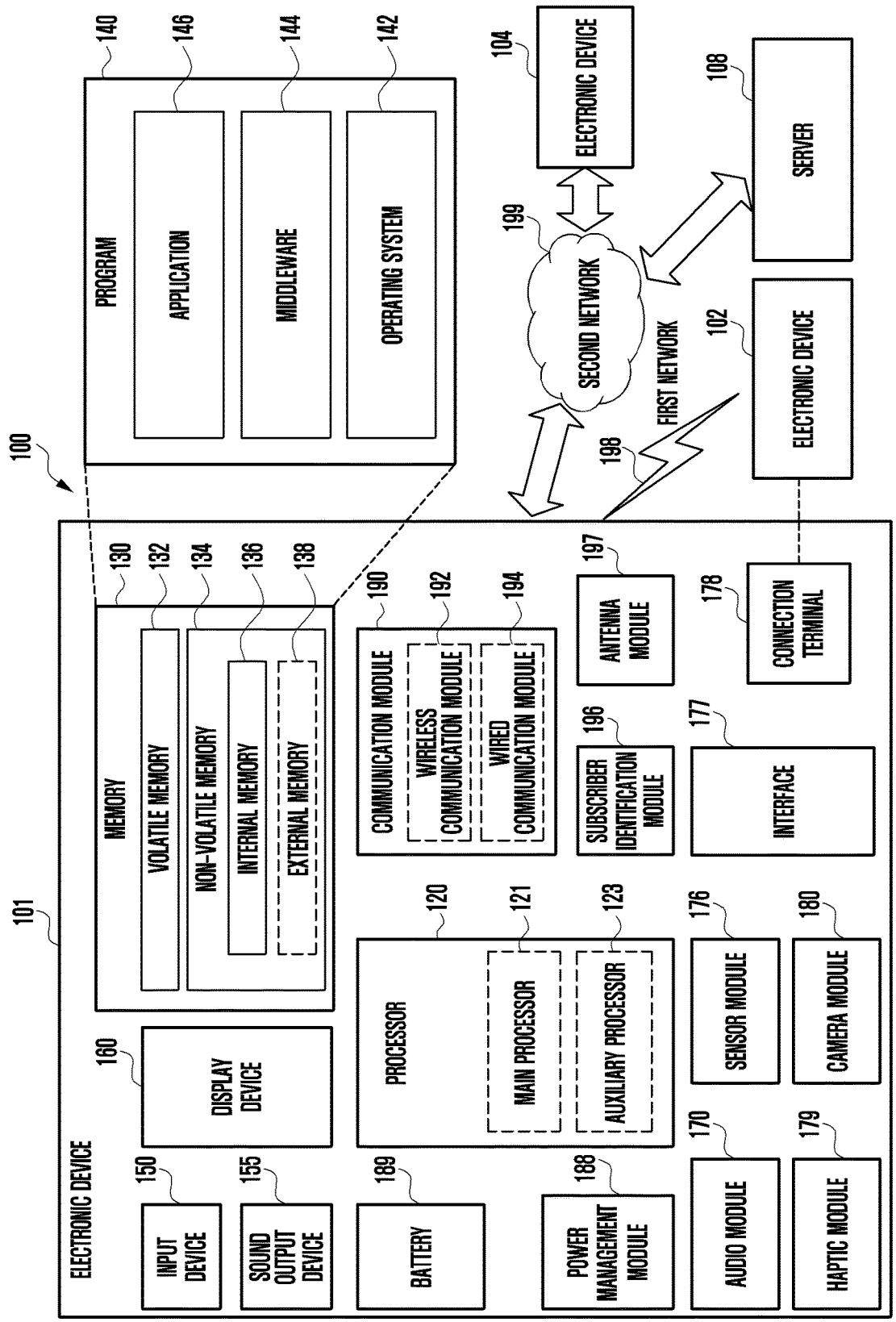
FIG. 1 is a block diagram of an electronic device receiving wireless power in a network environment, according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation.

According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
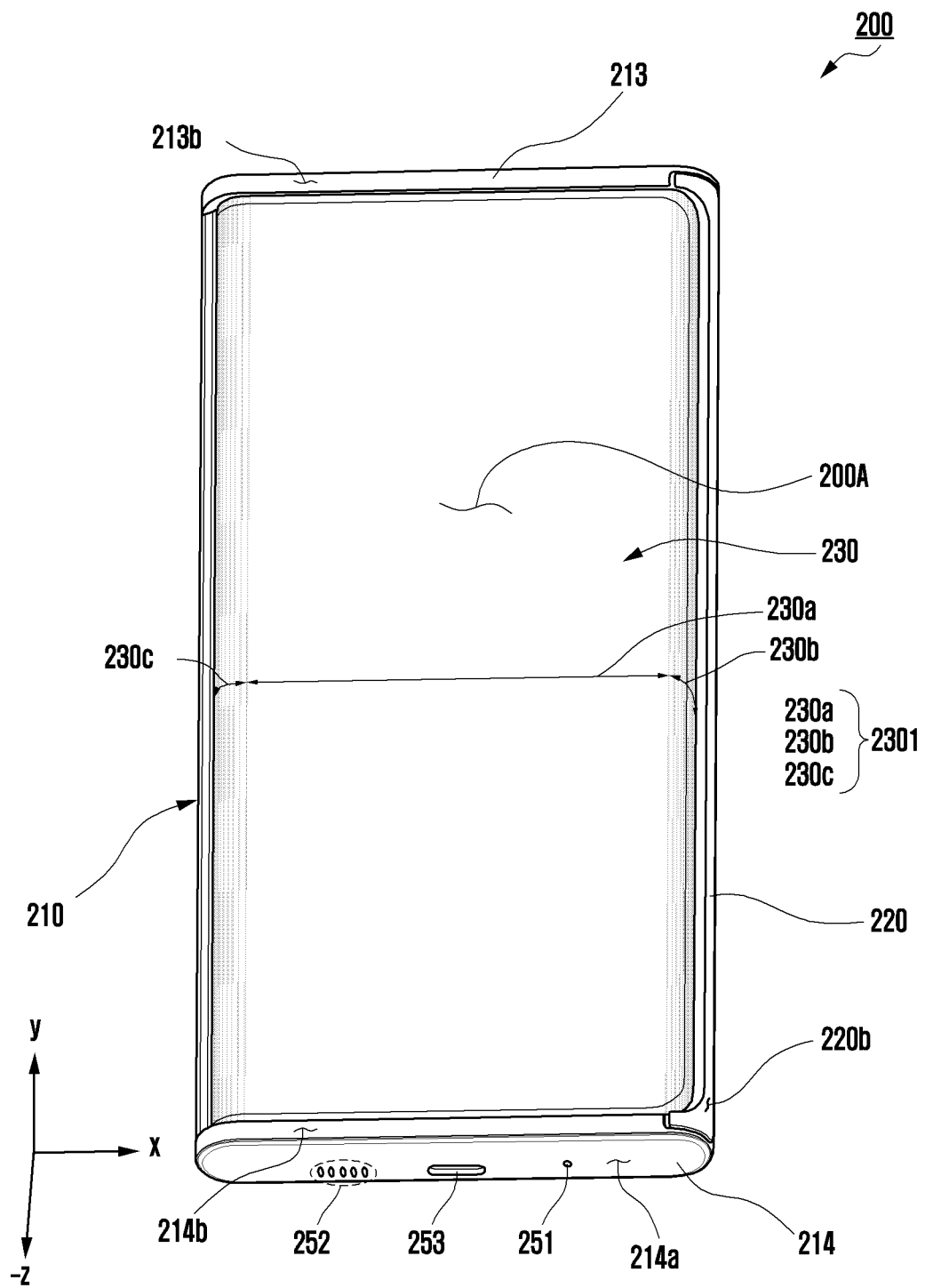
FIG. 2A is a front perspective view of an electronic device in a closed state according to one embodiment.
Figure 2B:
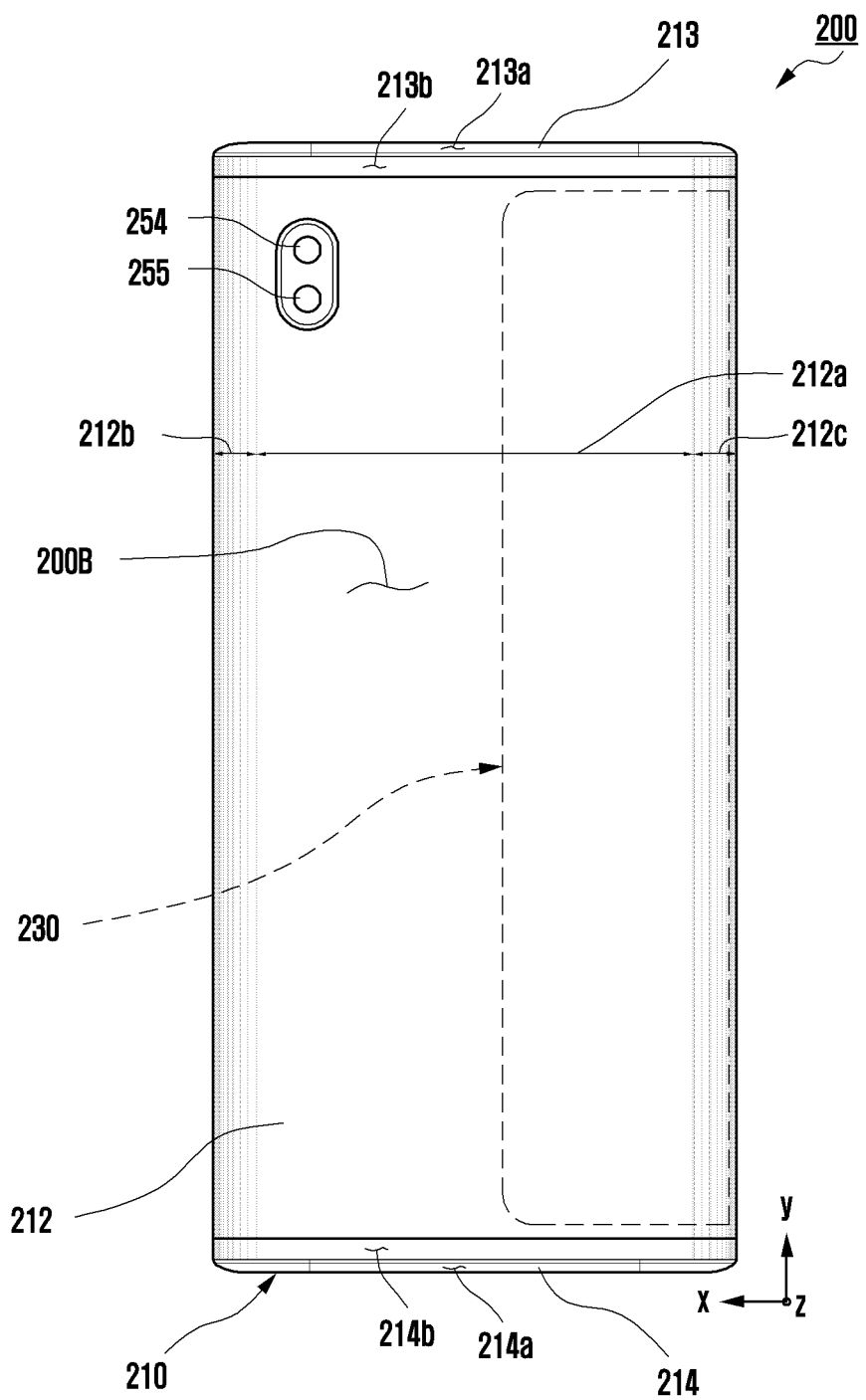
FIG. 2B is a rear perspective view of an electronic device in a closed state according to one embodiment.
Figure 3A:
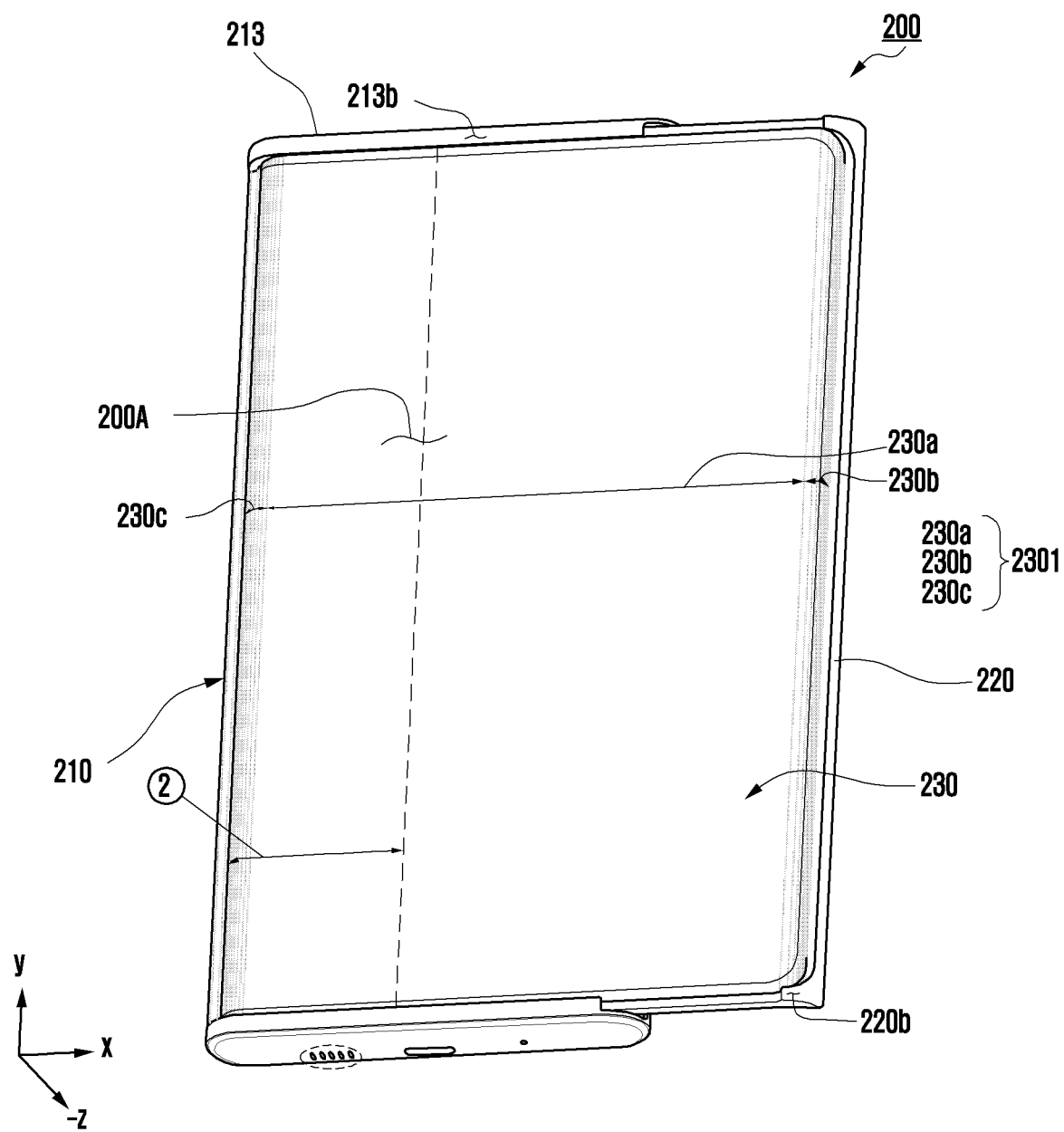
FIG. 3A is a front perspective view of an electronic device in an open state according to one embodiment.
Figure 3B:
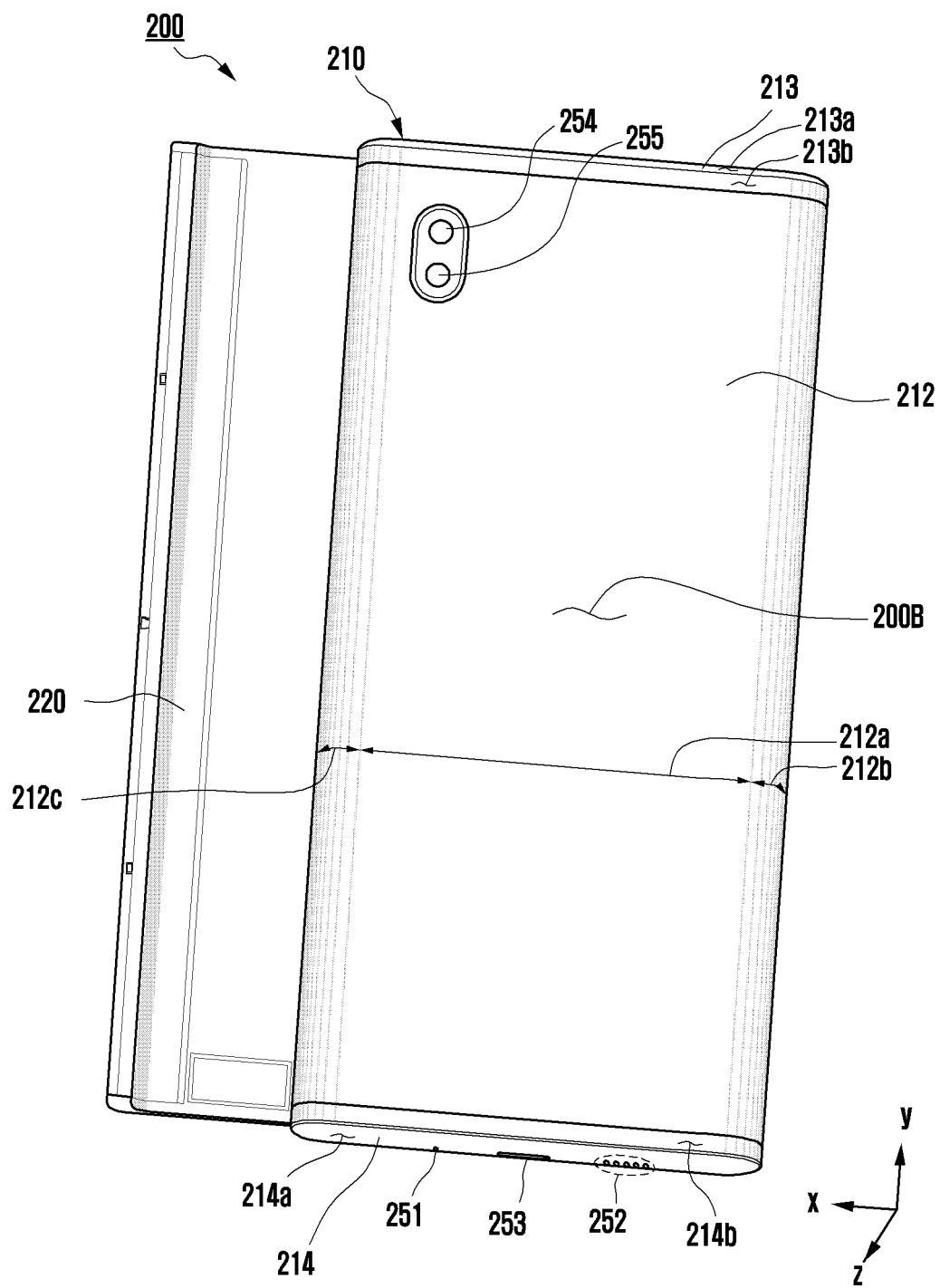
FIG. 3B is a rear perspective view of an electronic device in an open state according to one embodiment.

FIG. 2A is a front perspective view of an electronic device 200 in a closed state according to one embodiment. FIG. 2B is a rear perspective view of the electronic device 200 in a closed state according to one embodiment. FIG. 3A is a front perspective view of the electronic device 200 in an open state according to one embodiment. FIG. 3B is a rear perspective view of the electronic device 200 in an open state according to one embodiment.

According to certain embodiments, the electronic device 200 in FIG. 2A may include an electronic device 101 in FIG. 1.

Referring to FIGS. 2A, 2B, 3A, and 3B, the electronic device 200 in one embodiment may be implemented such that a screen 2301 thereof can be expanded in a sliding manner. For example, the screen 2301 may be an area of a flexible display 230, which is seen from the outside. FIGS. 2A and 2B illustrate the electronic device 200 in a state in which the screen 2301 is not expanded, and FIGS. 3A and 3B illustrate the electronic device 200 in a state in which the screen 2301 is expanded. The state in which the screen 2301 is not expanded may be a state in which a sliding plate 220 for sliding motion of the flexible display 230 is not slid out and may be hereinafter referred to as the "closed state". The state in which the screen 2301 is expanded may be a maximally expanded state in which the screen 2301 is slid out by the sliding plate 220 as much as possible, and may be hereinafter referred to as the "open state." Alternatively, the sliding plate 220 may partially move in a first direction (e.g., +x-axis direction) when the electronic device 200 is transitioned from the closed state to the open state. According to certain embodiments, in comparison with the closed state, the open state or a partially open state may be defined as states in which the screen 2301 is expanded, and may provide screens of various sizes according to the position at which the sliding plate 220 has moved. According to certain embodiments, an intermediate state may refer to a state between the closed state in FIG. 2A and the open state in FIG. 3A. The screen 2301 may include an active area of the flexible display 230 that is visually exposed so as to enable an image to be output, and the electronic device 200 may adjust the active area according to the movement of the sliding plate 220 or the movement of the flexible display 230. In the following description, the open state may refer to a state in which the screen 2301 is expanded to the maximum. In an embodiment, the flexible display 230 disposed to be slidably movable on the electronic device 200 in FIG. 2A to provide the screen 2301 may be referred to as a "slide-out display" or "expandable display." In one embodiment, the sliding structure related to the flexible display 230 of the electronic device 200 may include a free-stop structure. For example, when the flexible display 230 is moved by an external force, due to the free-stop structure included in the sliding structure, the electronic device 200 may move the flexible display 230 only by the distance caused by the external force.

According to certain embodiments, the electronic device 200 may include a sliding structure related to the flexible display 230. For example, when the flexible display 230 is moved to a predetermined distance by an external force, due to an elastic structure included in the sliding structure, the flexible display 230 may be transitioned from the closed state to the open state or from the open state to the closed state without any further external force (e.g., semi-automatic slide motion). According to an embodiment, when a signal is generated through an input device included in the electronic device 200, the electronic device 200 may be transitioned from the closed state to the open state or from the open state to the closed state due to a driving device such as a motor connected to the flexible display 230. For example, when a signal is generated through a hardware button or a software button provided through a screen, the electronic device 200 may be transitioned from the closed state to the open state or from the open state to the closed state.

According to certain embodiments, when signals are generated from various sensors such as a pressure sensor, the electronic device 200 may be transitioned from the closed state to the open state or from the open state to the closed state. For example, when the electronic device 200 is carried or grasped by a hand of a user, a squeeze gesture in which a portion of the hand (e.g., palm or finger) presses a predetermined portion of the electronic device 200 may be detected by the sensor, and in response thereto, the electronic device 200 may be transitioned from the closed state to the open state or from the open state to the closed state.

According to one embodiment, the display 230 may include a second section ②  (see FIG. 3A). The second section ② may include an expanded portion of the screen 2301 when the electronic device 200 is transitioned from the closed state to the open state. When the electronic device 200 is transitioned from the closed state to the open state, the second section (②) may be slid out from the inner space of the electronic device 200, and thus the screen 2301 may increase in area. When the electronic device 200 is transitioned from the open state to the closed state, at least a portion of the second section (②) may be drawn back into the inner space of the electronic device 200 in a sliding manner, and thus the screen 2301 may be reduced in area. When the electronic device 200 is transitioned from the open state to the closed state, at least a portion of the second section ② may be bent and moved into the inner space of the electronic device 200. For example, the flexible display 230 may include a flexible substrate (e.g., plastic substrate) made of a polymer material such as polyimide (PI) or polyester (PET). The second section ② is a portion of the flexible display 230 that may be bent when the electronic device 200 is transitioned between the open state and the closed state, and may also be referred to as, for example, the bendable section of the flexible display. In the following description, the second section ((②)) will be referred to as the bendable section.

According to one embodiment, the electronic device 200 may include a housing 210, the sliding plate 220, and/or the flexible display 230.

The housing (or case) 210 may include, for example, a back cover 212, a first side cover 213, or a second side cover 214. The back cover 212, the first side cover 213, or the second side cover 214 may be connected to a support member (not shown) located inside the electronic device 200, and may define at least a portion of the external appearance of the electronic device 200.

The back cover 212 may include, for example, at least a portion of the rear surface 200B of the electronic device 200. In one embodiment, the back cover 212 may be substantially opaque. For example, the back cover 212 may be made of coated or colored glass, ceramic, polymer, or metal (e.g., aluminum, stainless steel (STS), or magnesium), or a combination of at least two of the above materials. According to an embodiment, in a state in which the bendable section ② of the flexible display 230 is drawn into the inner space of the housing 210 (e.g., closed state), at least a portion of the bendable section ② may also be disposed to be visible from the outside through the back cover 212. In this case, the back cover 212 may be made of a transparent material and/or a translucent material.

According to one embodiment, the back cover 212 may include a flat portion 212a and curved portions 212b and 212c positioned opposite to each other with the flat portion 212a interposed therebetween. The curved portions 212b and 212c may be formed adjacent to the longitudinal edges (not shown) of the back cover 212, respectively, and may be curved and seamlessly extend toward the screen located on the front of the electronic device 200. According to an embodiment, the back cover 212 may include one of the curved portions 212b and 212c or may be implemented without the curved portions 212b and 212c.

According to one embodiment, the first side cover 213 and the second side cover 214 may be positioned opposite to each other. For example, the first side cover 213 and the second side cover 214 may be positioned opposite to each other in a second direction (e.g., y-axis direction) perpendicular to the first direction (e.g., +x-axis direction) of the sliding movement of the sliding plate 220, with the flexible display 230 interposed therebetween. The first side cover 213 may form at least a portion of the first side surface 213a of the electronic device 200, and the second side cover 214 may form at least a portion of a second side surface 214a of the electronic device 200, facing in a direction opposite the first side surface 213a. The first side cover 213 may include a first edge portion (or first rim) 213b extending from the edge of the first side surface 213a. For example, the first edge portion 213b may form at least a portion of a bezel at one side of the electronic device 200. The second side cover 214 may include a second edge portion (or second rim) 214b extending from the edge of the second side surface 214a. For example, the second edge portion 214b may form at least a portion of the bezel at the other side of the electronic device 200. According to one embodiment, the surface of the first edge portion 213b, the surface of the second edge portion 214b, and the surface of the sliding plate 220 may be smoothly connected in the closed state as shown in FIG. 2A and may thus form a curved portion on one side thereof, corresponding to the first curved portion 230b of the screen 2301. According to certain embodiments, the surface of the first edge portion 213b or the surface of the second edge portion 214b may include a curved portion on the other side thereof, corresponding to the second curved portion 230c of the screen 2301, which is positioned opposite to the first curved portion 230b.

According to one embodiment, the sliding plate 220 may slide on a support member (not shown) located inside the electronic device 200. At least a portion of the flexible display 230 may be disposed on the sliding plate 220, and the closed state of FIG. 2A or the open state of FIG. 3A may be realized based on a position of the sliding plate 220 on the support member. According to one embodiment, the flexible display 230 may be attached to the sliding plate 220 through an adhesive member (not shown). According to one embodiment, the adhesive member may include a heat-reactive adhesive member, a photoreactive adhesive member, a general adhesive, and/or a double-sided tape. According to an embodiment, the flexible display 230 may be slidably inserted into a recess formed on the sliding plate 220 so that it is fixed onto the sliding plate 220. The sliding plate 220 may serve to support at least a portion of the flexible display 230 and may be referred to as a display support structure herein.

According to one embodiment, the sliding plate 220 may include a third edge portion 220b forming an outer surface (e.g., surface exposed to the outside to define the external appearance of the electronic device 200) of the electronic device 200. For example, in the closed state of FIG. 2A, the third edge portion 220b may form the bezel around the screen together with the first edge portion 213b and the second edge portion 214b. In the closed state, the third edge portion 220b may extend in the second direction (e.g., y-axis direction) to connect one end of the first side cover 213 to one end of the second side cover 214. For example, in the closed state of FIG. 2A, the surface of the third edge portion 220b may be smoothly connected to the surface of the first edge portion 213b and/or the surface of the second edge portion 214b.

According to one embodiment, due to the slide-out of the sliding plate 220, at least a portion of the bendable section ② may come out from the inside of the electronic device 200, and accordingly, the state in which the screen 2301 is expanded (e.g., open state) may be provided as shown in FIG. 3A.

According to one embodiment, the screen 2301 in the closed state of FIG. 2A may include the flat portion 230a, and the first curved portion 230b and/or the second curved portion 230c which are positioned opposite to each other with the flat portion 230a interposed therebetween. For example, the first curved portion 230b and the second curved portion 230c may be substantially symmetrical to each other with the flat portion 230a interposed therebetween. For example, in the closed state of FIG. 2A, the first curved portion 230b and/or the second curved portion 230c may be positioned to correspond to the curved portions 212b and 212c of the back cover 212, respectively, and may be curved toward the back cover 212. When the closed state of FIG. 2A is transitioned to the open state of FIG. 3A, the flat portion 230a may be expanded. For example, a partial area of the bendable section ②, which forms the second curved portion 230c in the closed state of FIG. 2A, may be included in the expanded flat portion 230a and formed as another area of the bendable section ② when the closed state of FIG. 2A is transitioned to the open state of FIG. 3A.

According to one embodiment, the electronic device 200 may include an opening (not shown) for the slide-in and slide-out of the bendable section ②, and/or a pulley (not shown) positioned at the opening. The pulley may be positioned to correspond to the bendable section (②), and the movement of the bendable section (②) and the moving direction thereof may be guided through the rotation of the pulley in transition between the closed state of FIG. 2A and the open state of FIG. 3A. The first curved portion 230b may be formed to correspond to a curved surface formed on one surface of the sliding plate 220. The second curved portion 230c may be formed by a portion corresponding to a curved surface of the pulley in the bendable section ②. The first curved portion 230b may be positioned opposite to the second curved portion 230c in the closed or open state of the electronic device 200 to improve the aesthetics of the screen 2301. According to an embodiment, the flat portion 230a may be expanded such that the first curved portion 230b does not exist.

According to one embodiment, the flexible display 230 may further include a touch sensing circuit (e.g., touch sensor). According to certain embodiments (not shown), the flexible display 230 may be coupled to or disposed adjacent to a pressure sensor capable of measuring the intensity (pressure) of a touch and/or a digitizer that detects a magnetic field type pen input device (e.g., stylus pen). For example, the digitizer may include a coil member disposed on a dielectric substrate so as to detect electromagnetic induction type resonance frequencies applied from a pen input device.

According to one embodiment, the electronic device 200 may include a microphone hole 251 (e.g., the input module 150 in FIG. 1), a speaker hole 252 (e.g., the sound output module 155 in FIG. 1), a connector hole 253 (e.g., the connection terminal 178 in FIG. 1), a camera module 254 (e.g., the camera module 180 in FIG. 1), or a flash 255. According to certain embodiments, the flash 255 may be included in the camera module 254. In an embodiment, the electronic device 200 may omit at least one of the elements or may further include other elements.

The microphone hole 251 may be formed through at least a portion of the second side surface 214a to correspond to, for example, a microphone (not shown) located inside the electronic device 200. The location of the microphone hole 251 is not limited to the embodiment of FIG. 2A and may vary. According to an embodiment, the electronic device 200 may include a plurality of microphones capable of detecting directional sound.

The speaker hole 252 may be formed through at least a portion of the second side surface 214a to correspond to, for example, a speaker positioned inside the electronic device 200. The position of the speaker hole 252 is not limited to the embodiment of FIG. 2A and may be varied. According to certain embodiments, the electronic device 200 may include a receiver hole for phone calls. In an embodiment, the microphone hole 251 and the speaker hole 252 may be implemented in one hole, or the speaker hole 252 may be omitted when the speaker is implemented as a piezo speaker.

The connector hole 253 may be formed through at least a portion of the second side surface 214a to correspond to, for example, a connector (e.g., USB connector) located inside the electronic device 200. The electronic device 200 may transmit and/or receive power and/or data to and from an external electronic device electrically connected to the connector through the connector hole 253. The location of the connector hole 253 is not limited to the embodiment of FIG. 2A and may be varied.

The camera module 254 and the flash 255 may be located, for example, on the rear surface 200B of the electronic device 200. The camera module 254 may include one or more lenses, an image sensor, and/or an image signal processor. The flash 255 may include, for example, a light emitting diode or a xenon lamp. In an embodiment, two or more lenses (infrared camera and wide-angle and telephoto lenses) and image sensors may be located on one surface of the electronic device 200. According to certain embodiments, the electronic device 200 is not limited to the embodiment of FIG. 2B or 3B and may include a plurality of camera modules. The camera module 254 may be one of a plurality of camera modules. For example, the electronic device 200 may include a plurality of camera modules (e.g., dual cameras or triple cameras), each of which has different properties (e.g., angle of view) or functions. For example, a plurality of camera modules (e.g., camera module 254) including lenses having different angles of view may be provided, and the electronic device 200 may control based on a user's selection such that the angle of view of the camera module performed in the electronic device 200 is changed. In addition, the plurality of camera modules may include at least one of a wide-angle camera, a telephoto camera, a color camera, a monochrome camera, or an infrared (IR) camera (e.g., time of flight (TOF) camera and structured light camera). According to one embodiment, the IR camera may operate as at least a part of a sensor module (not shown).

According to certain embodiments (not shown), the electronic device 200 may further include a camera module (e.g., front camera) which generates an image signal, based on light received through one surface (e.g., front surface 200A) of the electronic device 200, placed in a direction toward which the screen 2301 is directed. For example, the camera module 254 is not limited to the embodiment of FIG. 2B or 3B and may be aligned with an opening (e.g., through-hole or notch) formed through the flexible display 230 to be positioned inside the housing 210. The camera module 254 may receive light through the opening and a partial area of a transparent cover overlapping the opening, to generate an image signal. The transparent cover may serve to protect the flexible display 230 from the outside and may include, for example, a material, such as polyimide or ultra-thin glass (UTG).

According to an embodiment, the camera module 254 is not limited to the embodiment of FIG. 2B or 3B and may be disposed at the end of at least a portion of the screen 2301 of the flexible display 230, and may perform functions such as image capture while the position of the camera module 254 is not visually distinguishable from the display. In this case, for example, the camera module 254 may be disposed to overlap at least a portion of the screen 2301 to acquire an image of an external subject without being exposed to the outside when viewed from the top of the screen 2301 (e.g., viewed in the −z-axis direction).

According to certain embodiments (not shown), the electronic device 200 may further include a key input device (e.g., the input module 150 in FIG. 1). The key input device may be located, for example, on the first side surface 213a of the electronic device 200, which is configured by the first side cover 213. In an embodiment (not shown), the key input device may include at least one sensor module.

According to certain embodiments (not shown), the electronic device 200 may include various sensor modules (e.g., the sensor module 176 in FIG. 1). The sensor module may generate an electrical signal or data value corresponding to an internal operation state of the electronic device 200 or an external environmental state thereof. For example (not shown), the sensor module may include a proximity sensor which generates a signal related to approaching of an external object, based on light received through the front surface 200A of the electronic device 200, placed in the direction toward which the screen 2301 is directed. For another example (not shown), the sensor module may include various biometric sensors such as an HRM sensor or a fingerprint sensor for detecting information on a living body, based on light received through the front surface 200A or the rear surface 200B of the electronic device 200. The electronic device 200 may include at least one of various other sensor modules, for example, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

According to certain embodiments, the electronic device 200 is not limited to the embodiments of FIGS. 2A, 2B, 3A, and 3C and may also be implemented in a structure in which the screen can be further expanded using the third edge portion 220b when the sliding plate 220 is slid out. For example, a partial area of the flexible display 230, which forms the first curved portion 230b in the closed state of FIG. 2A, may be included in the expanded flat portion 230a when the closed state of FIG. 2A is transitioned to the open state of FIG. 3A, and the partial area may be formed as another area of the flexible display 230.

Figure 4A:
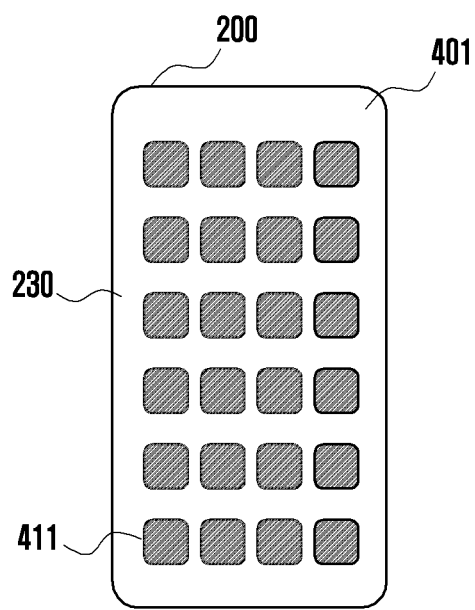
FIG. 4A illustrates a first state of a first screen operation in a main area before a flexible display of an electronic device according to certain embodiments is expanded.
Figure 4B:
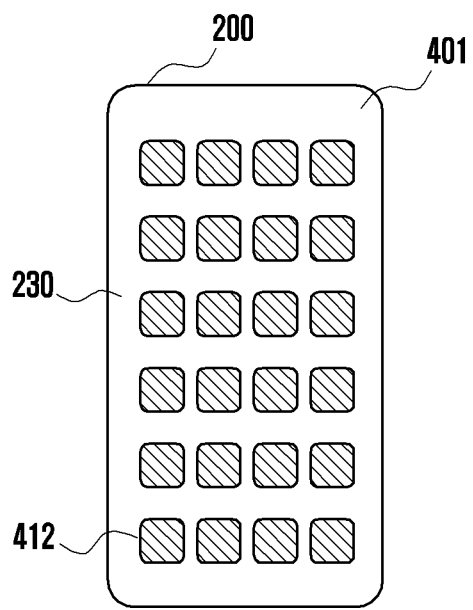
FIG. 4B illustrates a second state of the first screen operation in a main area before a flexible display of an electronic device according to certain embodiments is expanded.
Figure 4C:
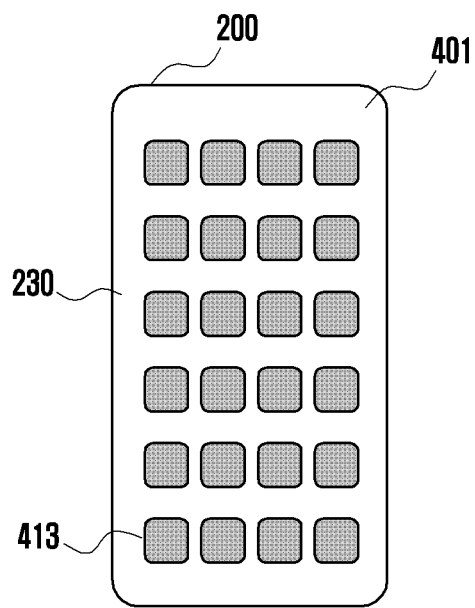
FIG. 4C illustrates a third state of the first screen operation in a main area before a flexible display of an electronic device according to certain embodiments is expanded.
Figure 4D:
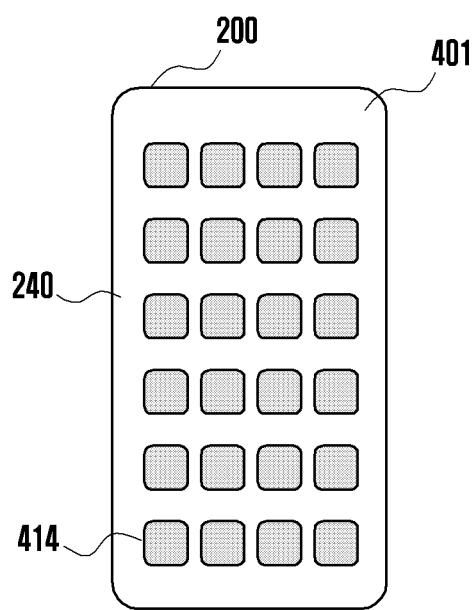
FIG. 4D illustrates a fourth state of the first screen operation in a main area before a flexible display of an electronic device according to certain embodiments is expanded.

FIG. 4A illustrates a first state of a first screen operation in a main area 401 before the flexible display 230 of the electronic device 200 according to an embodiment is expanded, FIG. 4B illustrates a second state of the first screen operation in the main area 401 before the flexible display 230 of the electronic device 200 according to an embodiment is expanded, FIG. 4C illustrates a third state of the first screen operation in the main area 401 before the flexible display 230 of the electronic device 200 according to an embodiment is expanded, and FIG. 4D illustrates a fourth state of the first screen operation in the main area 401 before the flexible display 230 of the electronic device 200 according to an embodiment is expanded.

In certain embodiments, the electronic device 200 may display at least one icon in the form of a page having a matrix (e.g., M×N matrix).

In certain embodiments, the electronic device 200 may include a plurality of pages. In FIGS. 4A to 4D, the electronic device 200 may include a first page 411, a second page 412, a third page 413, and/or a fourth page 414. In certain embodiments, the electronic device 200 may include more or fewer pages than the number of pages including the first page 411 to the fourth page 414. The electronic device 200 may display the first page 411, the second page 412, the third page 413, and/or the fourth page 414 in the main area 401 of the flexible display 230.

In certain embodiments, the plurality of pages may be changed by a user input. For example, the page displayed on the flexible display 230 may change from the first page 411 to the second page 412 or from the second page 412 to the first page 411 according to a user input (e.g., drag or swipe input).

In certain embodiments, the main area 401 may be an active area of the flexible display 230 when the flexible display 230 is in the slide-in or closed state.

Figure 5A:
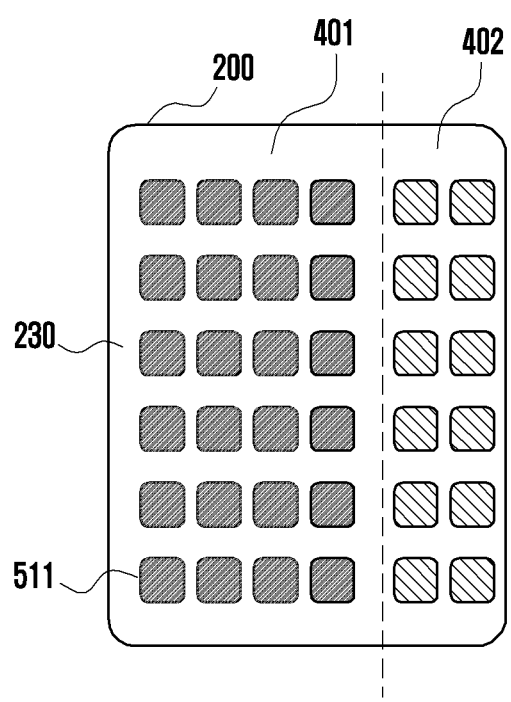
FIG. 5A illustrates a first state of a second screen operation in a main area and/or an expansion area when a flexible display of an electronic device according to certain embodiments is slid out.
Figure 5B:
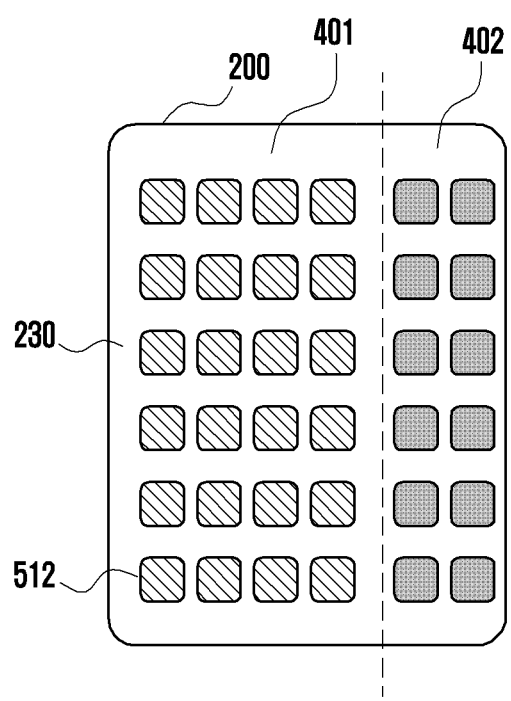
FIG. 5B illustrates a second state of the second screen operation in a main area and/or an expansion area when a flexible display of an electronic device according to certain embodiments is slid out.
Figure 5C:
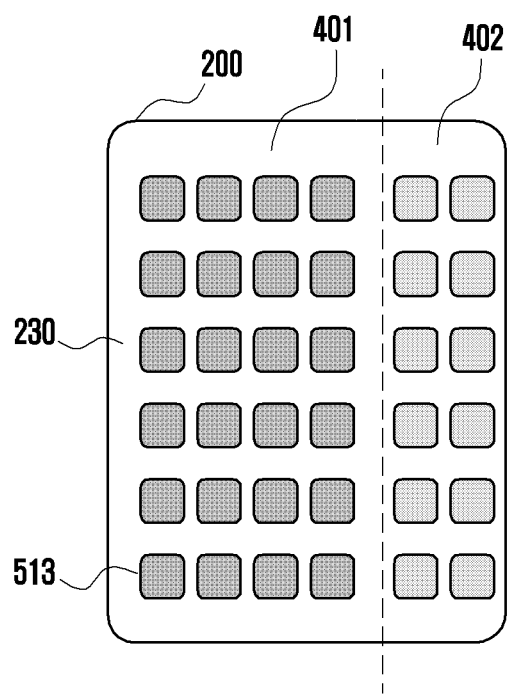
FIG. 5C illustrates a third state of the second screen operation in a main area and/or an expansion area when a flexible display of an electronic device according to certain embodiments is slid out.
Figure 5D:
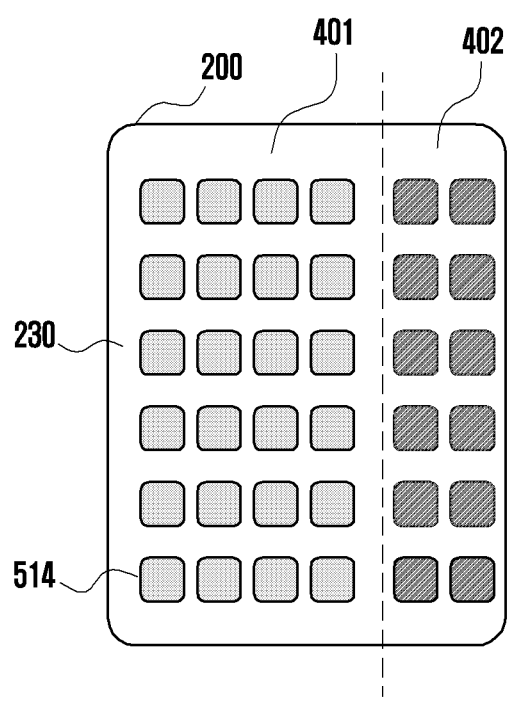
FIG. 5D illustrates a fourth state of the second screen operation in a main area and/or an expansion area when a flexible display of an electronic device according to certain embodiments is slid out.

FIG. 5A illustrates a first state of a second screen operation in the main area 401 and/or an expansion area 402 when the flexible display 230 of the electronic device 200 according to certain embodiments is slid out, FIG. 5B illustrates a second state of the second screen operation in the main area 401 and/or the expansion area 402 when the flexible display 230 of the electronic device 200 according to certain embodiments is slid out, FIG. 5C illustrates a third state of the second screen operation in the main area 401 and/or the expansion area 402 when the flexible display 230 of the electronic device 200 according to certain embodiments is slid out, and FIG. 5D illustrates a fourth state of the second screen operation in the main area 401 and/or the expansion area 402 when the flexible display 230 of the electronic device 200 according to certain embodiments is slid out.

In certain embodiments, the electronic device 200 may include a free-stop structure related to the flexible display 230. For example, due to the free-stop structure of the electronic device 200, the expansion area 402 may be smaller than the main area 401. The expansion area 402 may have an area smaller than that of the main area 401. Due to the free-stop structure of the electronic device 200, the expansion area 402 may be the same as the main area 401. The expansion area 402 may have the same area as the main area 401. In certain embodiments, the electronic device 200 may display at least one icon in the form of a page having a matrix (e.g., M×(N+L) matrix).

In certain embodiments, the main area 401 of the electronic device 200 may be displayed in the form of an M×N matrix, and the expansion area 402 thereof may be displayed in the form of an M×L matrix.

In certain embodiments, in the M×N matrix and the M×L matrix, N and L are integers greater than or equal to 1, and L may be a number less than or equal to N. For example, if N is 4, L may be one of 4, 3, 2, and 1. If the M×N matrix includes 4 columns, the M×L matrix may include at least one of 4 columns, 3 columns, 2 columns, and 1 column.

In certain embodiments, the electronic device 200 may include a plurality of pages. In FIGS. 5A to 5D, the electronic device 200 may include a fifth page 511, a sixth page 512, a seventh page 513, and/or an eighth page 514. In certain embodiments, the electronic device 200 may include more or fewer pages than the number of pages including the fifth page 511 to the eighth page 514.

Referring to FIGS. 4A to 5D, the fifth page 511 may be configured such that the first page 411 is displayed in the main area 401 and at least a portion of the second page 412 is displayed in the expansion area 402.

In certain embodiments, the fifth page 511 may be configured such that the first page 411 is displayed in the main area 401, and certain columns of the second page 412, corresponding to the width of the expansion area 402, are displayed in the expansion area 402.

The sixth page 512 may be configured such that the second page 412 is displayed in the main area 401 and at least a portion of the third page 413 is displayed in the expansion area 402.

In various embodiments, the sixth page 512 may be configured such that the second page 412 is displayed in the main area 401, and certain columns on the third page 413, corresponding to the width of the expansion area 402, are displayed in the expansion area 402.

The seventh page 513 may be configured such that the third page 413 is displayed in the main area 401 and at least a portion of the fourth page 414 is displayed in the expansion area 402.

In various embodiments, the seventh page 513 may be configured such that the third page 413 is displayed in the main area 401, and certain columns on the fourth page 414, corresponding to the width of the expansion area 402, are displayed in the expansion area 402.

The eighth page 514 may be configured such that the fourth page 414 is displayed in the main area 401 and at least a portion of the first page 411 is displayed in the expansion area 402.

In certain embodiments, the eighth page 514 may be configured such that the fourth page 414 is displayed in the main area 401, and certain columns on the first page 411, corresponding to the width of the expansion area 402, are displayed in the expansion area 402. The fourth page 414 may be the last page among the plurality of pages when the electronic device 200 is in the slide-in state. In this case, when the electronic device 200 is in a slide-out state, the expansion area 402 may display at least some icons included on the first page 411.

In certain embodiments, the plurality of pages may be changed by a user input. For example, the page displayed on the flexible display 230 may change from the fifth page 511 to the sixth page 512 or from the sixth page 512 to the fifth page 511 according to a user input (e.g., drag input).

In certain embodiments, the expansion area 402 may be an area formed by adding at least a portion of an inactive area in the slide-in state of the flexible display 230 as an additional active area to the main area 401 when the flexible display 230 is in the slide-out state.

Figure 6A:
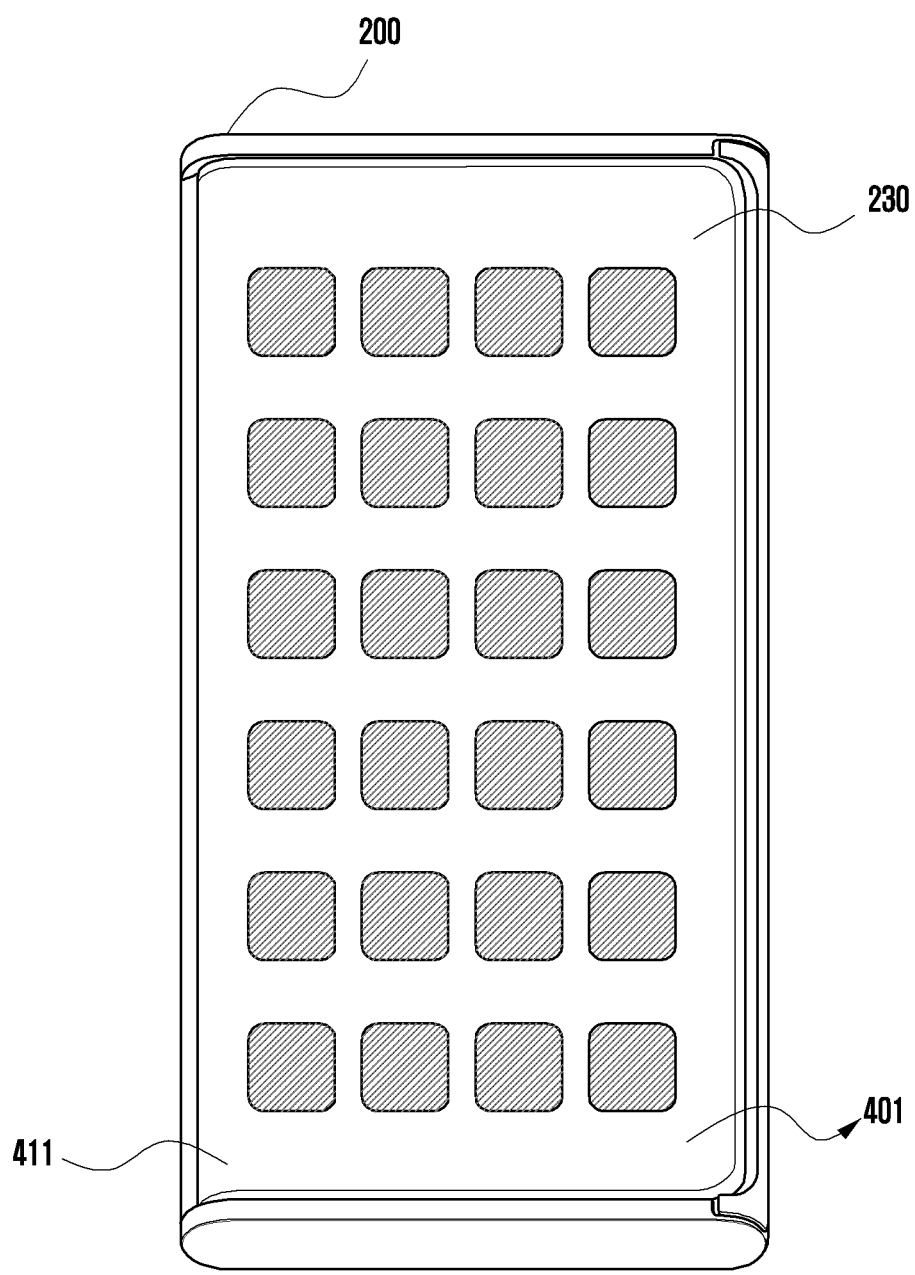
FIG. 6A illustrates a first screen operation in a main area before a flexible display of an electronic device according to certain embodiments is slid out.

FIG. 6A illustrates a first screen operation in the main area 401 before the flexible display 230 of the electronic device 200 according to certain embodiments is slid out.

Figure 6B:
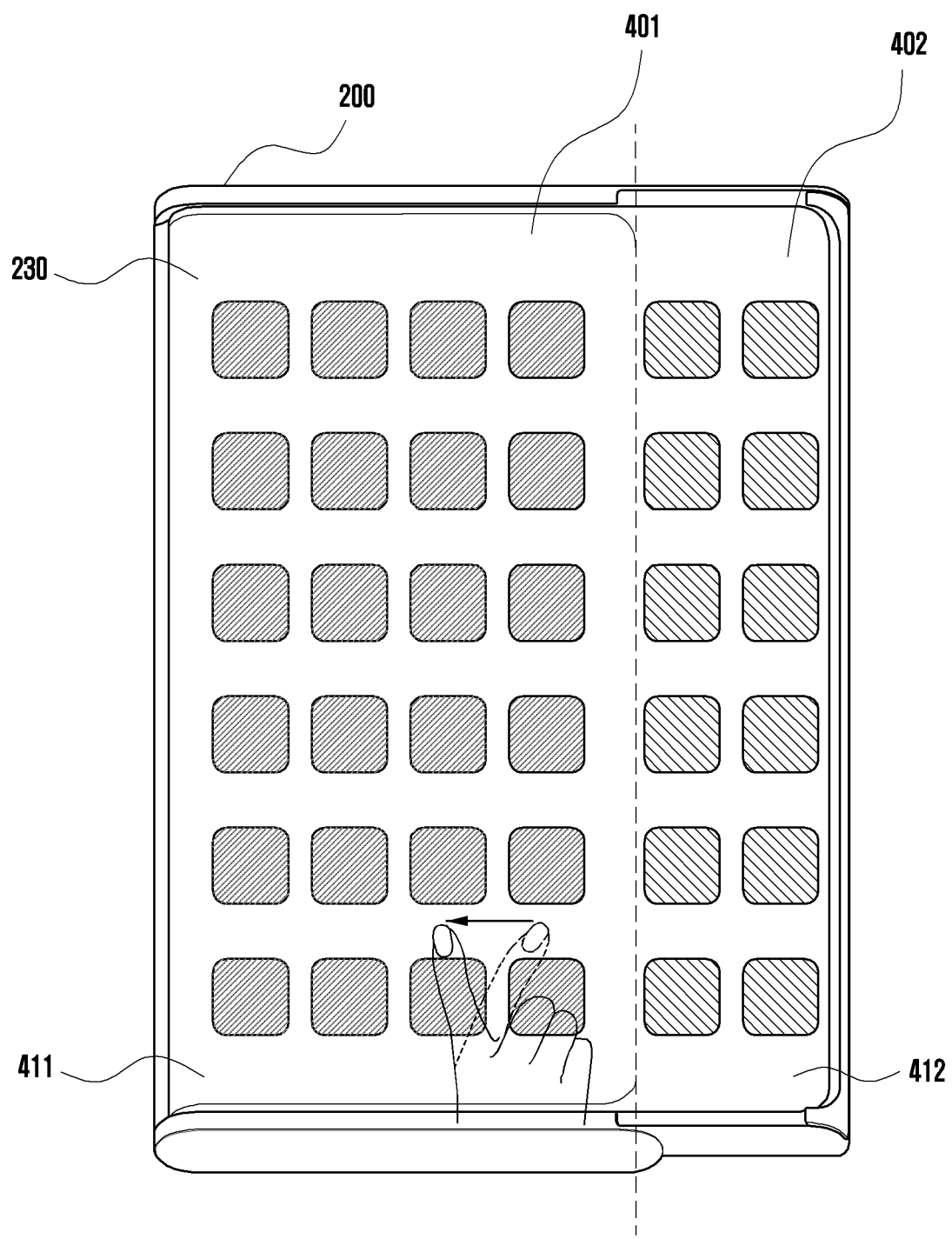
FIG. 6B illustrates a second screen operation in a main area and an expansion area while a flexible display of an electronic device according to certain embodiments is slid out.
Figure 6C:
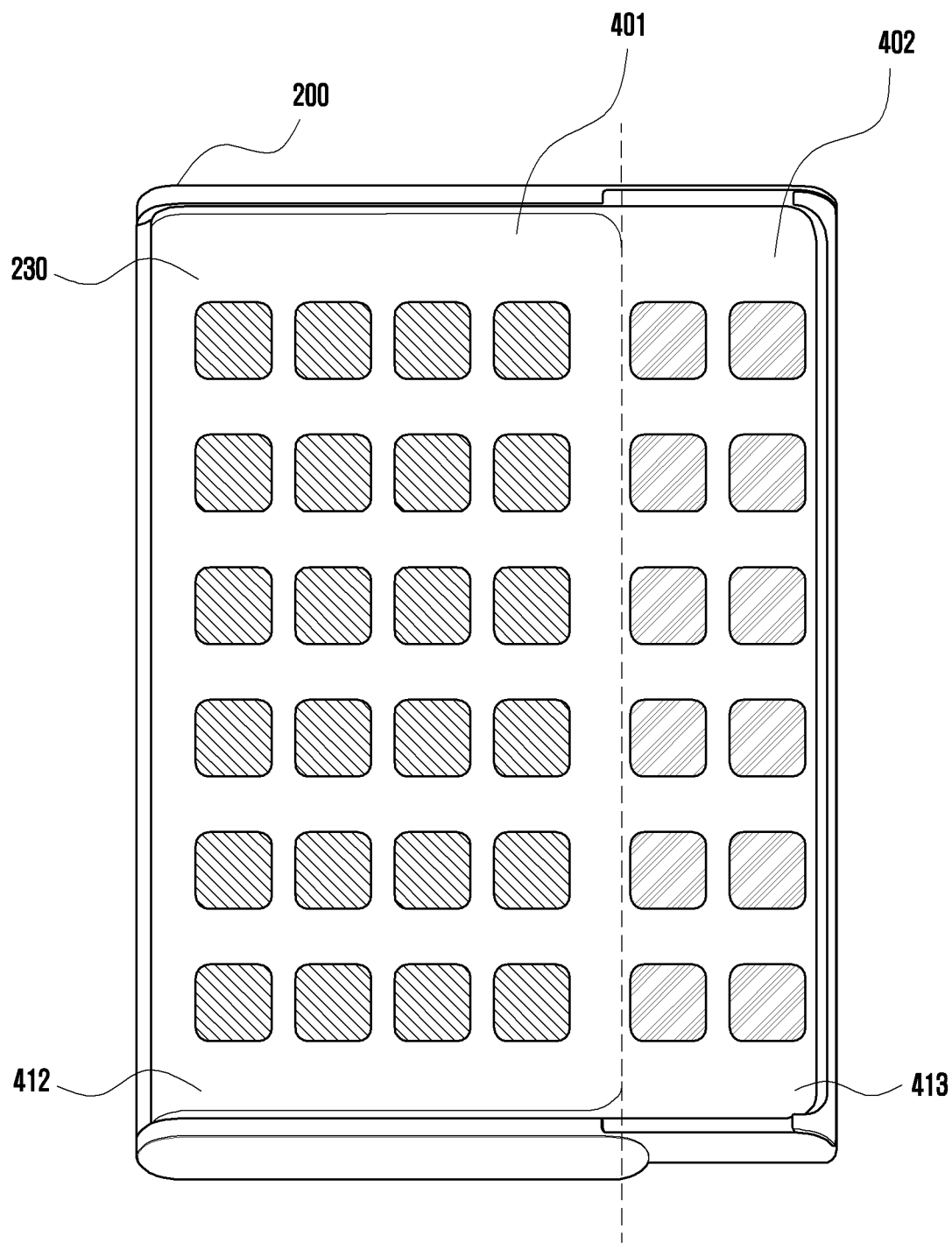
FIG. 6C illustrates a second screen operation in a main area and an expansion area while a flexible display of an electronic device according to certain embodiments is slid out.

FIG. 6B illustrates a second screen operation in the main area 401 and the expansion area 402 when the flexible display 230 of the electronic device 200 according to certain embodiments is slid out, and FIG. 6C illustrates a second screen operation in the main area 401 and the expansion area 402 when the flexible display 230 of the electronic device 200 according to certain embodiments is slid out.

In certain embodiments, a screen operation before the flexible display 230 is slid out may be referred to as a first screen operation, and a screen operation in a state in which the flexible display 230 is slid out may be referred to as a second screen operation.

In FIG. 6A, the electronic device 200 may display an app tray in the main area 401. For example, the app tray may be configured to display an icon corresponding to at least one application installed in the electronic device 200. The app tray may include a plurality of pages on which icons are arranged. The plurality of pages included in the app tray may allow icons to be arranged in the form of a matrix. For example, when at least one icon is displayed according to a 6×4 matrix (a matrix of 6 rows and 4 columns) in the slide-in state, the at least one icon may be positioned at designated 6×4 coordinates in which icons having a predetermined size are arranged at a predetermined interval in the center area of a page, excluding spaces at the edges of the page. But this is only an example, and there is no limit on the layout displayed in the form of a page having a matrix.

The electronic device 200 may display at least one icon, at least one application, at least one item, and/or at least one image in the main area 401.

In certain embodiments, the icon may be an app icon representing an application. The application may be, for example, a widget application displayed on a home screen and/or an app tray. The item may include a photo, a contact, and/or a list which include text and/or images. The image may include a thumbnail image or tile image related to an application, a photo, a file, or a contact.

In certain embodiments, the flexible display 230 of the electronic device 200 may display at least one icon, at least one application, at least one item, and/or at least one image in the form of a page having a matrix (for example, M×N matrix) in the main area 401 when the same is in a slide-in state.

In certain embodiments, the main area 401 may be an active area of the flexible display 230 when the flexible display 230 is in the slide-in state.

In certain embodiments, the main area 401 may be an area in which most elements of a page are displayed when the flexible display 230 is in the slide-out state. For example, the main area 401 may be an area in which icons are displayed while the flexible display 230 is in the slide-in state. Alternatively, the main area 401 may be an area in which most icons and/or widgets included on a specific page of a home screen and/or an app tray and having been displayed in the main area 401 in the slide-in state are displayed when the flexible display 230 is in the slide-out state.

In certain embodiments, when the flexible display 230 is in the slide-out state, the main area 401 may or may not include the bendable section ② of FIG. 3A. In certain embodiments, the flexible display 230 of the electronic device 200 may display at least one icon, at least one application, at least one item, and/or at least one image in the form of a page in an M×N matrix (for example, 6×4 matrix) in the main area 401 same as when in the slide-in state.

In certain embodiments, the electronic device 200 may include a plurality of pages. The electronic device 200 may display each page in a matrix (e.g., M×N matrix) form on the flexible display 230. The page displayed on the flexible display 230 may be successively changed according to a user input. For example, the pages may be displayed in the order of page I and page I+1 or in the order of page I+1 and page I according to a user input.

In FIGS. 6B and 6C, the electronic device 200 may display an app tray screen in the main area 401 and/or the expansion area 402.

In certain embodiments, the main area 401 and the expansion area 402 may be formed on the same plane.

In certain embodiments, the expansion area 402 may be at least a portion of the active area of the flexible display 230 when the flexible display 230 is in the slide-out state.

In certain embodiments, the expansion area 402 may be an area formed by adding at least a portion of an inactive area in the slide-in state of the flexible display 230 as an additional active area to the main area 401 when the flexible display 230 is in the slide-out state. In certain embodiments, the flexible display 230 of the electronic device 200 may display at least one icon in the form of a page having a matrix (for example, M×(N+L) matrix) in the main area 401 and/or the expansion area 402 in the slide-out state. At least some of icons displayed in the expansion area 402 may be displayed to be distinguished from at least some of icons displayed in the main area 401.

In certain embodiments, the electronic device 200 may include a free-stop structure related to the flexible display 230. For example, due to the free-stop structure of the electronic device 200, the expansion area 402 may be smaller than the main area 401. The expansion area 402 may have an area smaller than that of the main area 401. Due to the free-stop structure of the electronic device 200, the expansion area 402 may be the same as the main area 401. The expansion area 402 may have the same area as the main area 401.

In certain embodiments, the main area 401 of the electronic device 200 may be displayed in an M×N matrix form, and the expansion area 402 may be displayed in an M×L matrix form.

In certain embodiments, in the M×N matrix and the M×L matrix, N and L are integers greater than or equal to 1, and L may be a number less than or equal to N. For example, if N is 4, L may be one of 4, 3, 2, and 1. If the M×N matrix includes 4 columns, the M×L matrix may include at least one of 4 columns, 3 columns, 2 columns, and 1 column.

Page I may be displayed in the main area 401, and at least some of icons included on page I+1, for example, the M×L matrix on page I+1 may be displayed in the expansion area 402.

For example, in FIG. 6A, the electronic device 200 may display at least one icon included on the first page 411 in the main area 401.

In certain embodiments, a plurality of pages included in the app tray may have an order. The pages may be changed successively. For example, when one input (e.g., drag input) for scrolling the pages is received, the first page 411 may be turned to the second page 412. Each page may include page number mapped and stored as page property information. Number for a page including an icon may be mapped and stored as icon display information for the icon included on the page.

In FIG. 6B, when the flexible display 230 is slid out while the main area 401 is displayed, the first page 411 may be displayed in the main area 401 and at least some of icons included on the second page 412 may be displayed in the expansion area 402. In this case, when a page is moved according to a user input as shown in FIG. 6C, the second page 412 may be displayed in the main area 401 and at least some of icons included on the third page 413 may be displayed in the expansion area 402.

In certain embodiments, when the pages change according to a user input while the electronic device 200 is in the closed state, the pages displayed on the flexible display 230 may be changed in a page unit. In certain embodiments, when the pages change according to a user input while the electronic device 200 in the open state (or in an intermediate state) as shown in FIG. 6B, the whole of the page having been only partially displayed in the expansion area 402 may be displayed in the main area 401 as shown in FIG. 6C. For example, when the electronic device 200 receives a user input for screen change in a state where X columns of icons smaller than L columns of icons, in a page including M×L matrix of icons, are displayed in the expansion area 402, the M×L matrix of icons including the X columns of icons having been displayed in the expansion area 402 may be displayed in the main area 401.

In certain embodiments, when the last page is displayed while the flexible display 230 is slid out, the last page may be displayed in the main area 401 and a blank page may be displayed in the expansion area 402. The blank page may be, for example, a screen on which no icon is displayed.

In certain embodiments, when the last page is displayed while the flexible display 230 is slid out, the last page may be displayed in the main area 401 and at least some of icons included on the first page may be displayed in the expansion area 402.

Figure 7A:
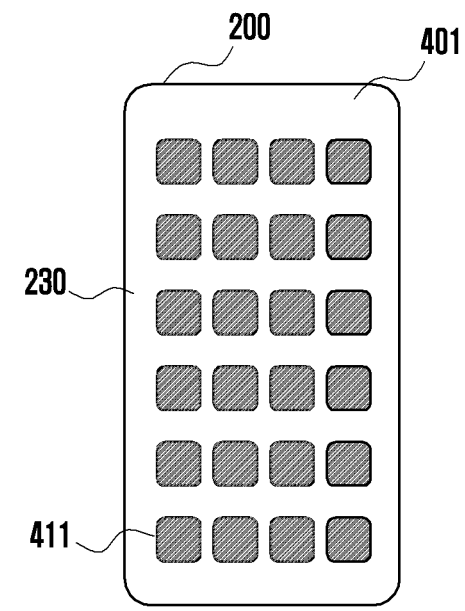
FIG. 7A illustrates a first operation switching between a displayed page when an electronic device is in a slide-in state and a displayed page when the electronic device is in a slide-out state, according to certain embodiments.
Figure 7A:
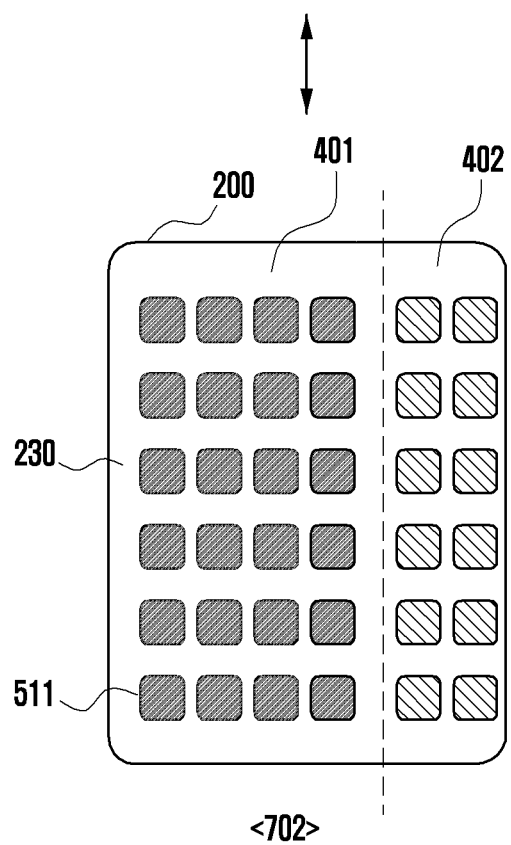
Figure 7B:
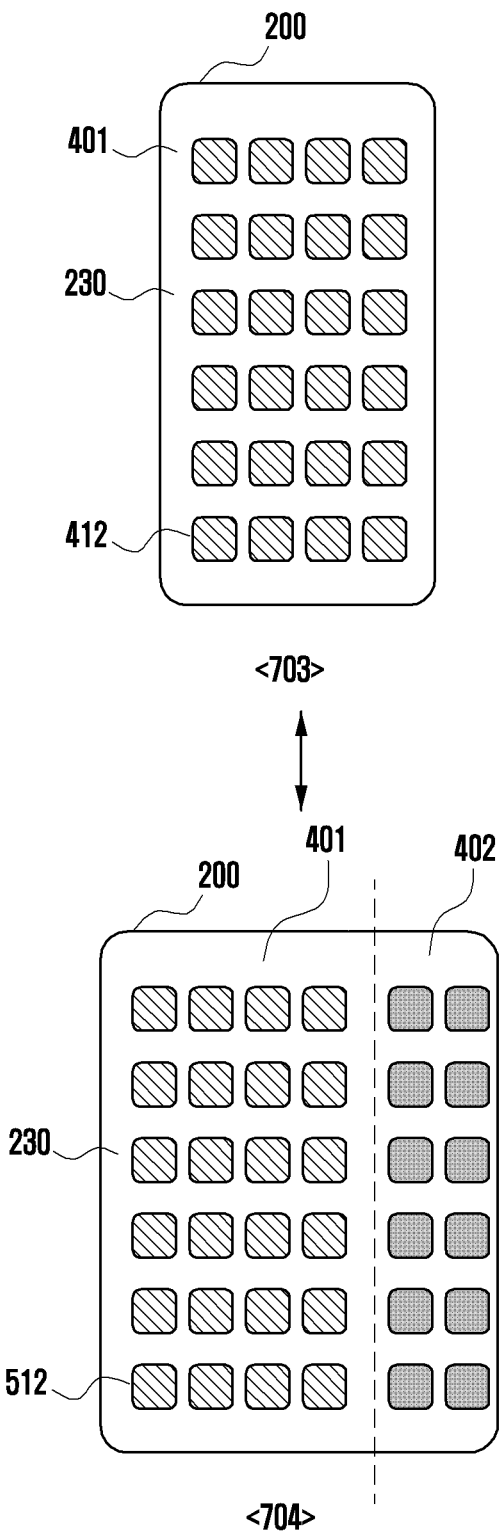
FIG. 7B illustrates a second operation switching between a displayed page when an electronic device is in a slide-in state and a displayed page when the electronic device is in a slide-out state, according to certain embodiments.
Figure 7C:
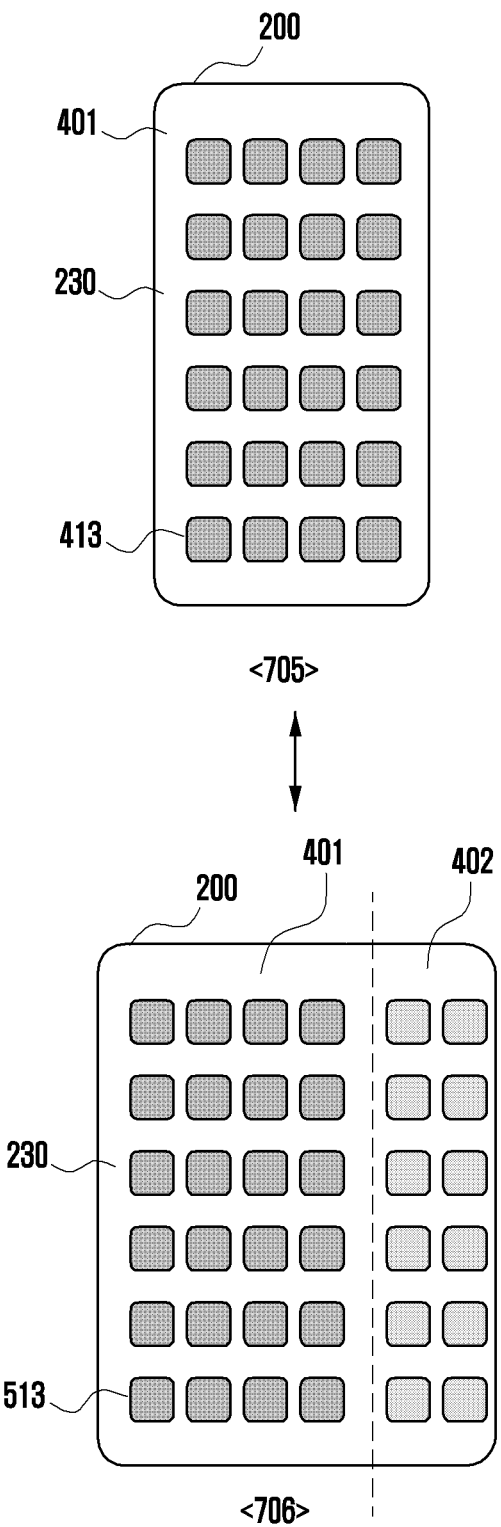
FIG. 7C illustrates a third operation switching between a displayed page when an electronic device is in a slide-in state and a displayed page when the electronic device is in a slide-out state, according to certain embodiments.
Figure 7D:
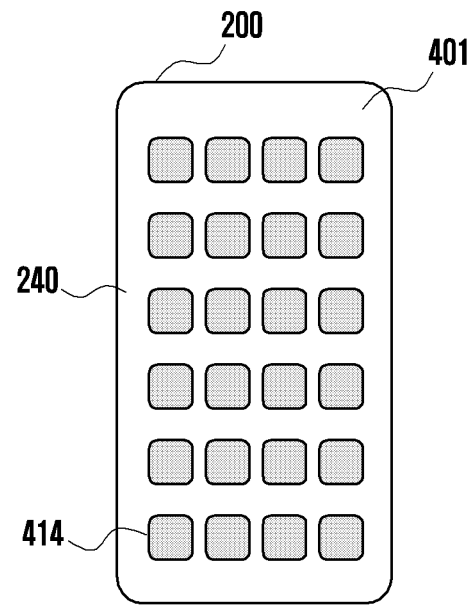
FIG. 7D illustrates a fourth operation switching between a displayed page when an electronic device is in a slide-in state and a displayed page when the electronic device is in a slide-out state, according to certain embodiments.
Figure 7D:
Figure 7D:
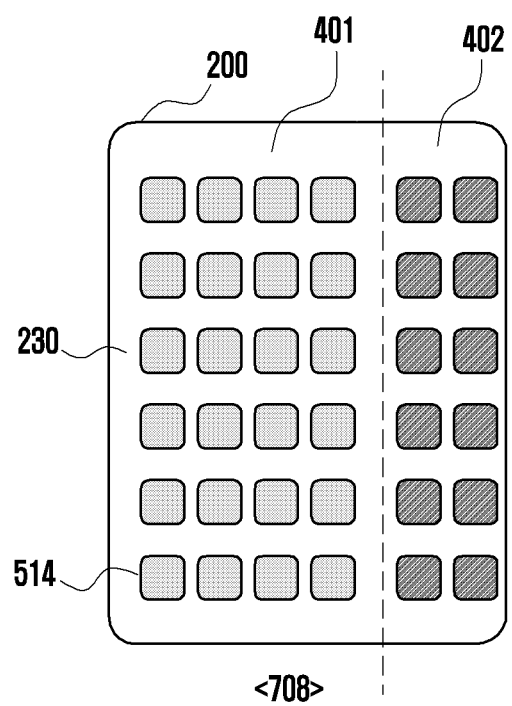

FIG. 7A illustrates a first operation switching between a displayed page when the electronic device 200 is in a slide-in state and a displayed page when the electronic device 200 is in a slide-out state, according to certain embodiments, FIG. 7B illustrates a second operation switching between a displayed page when the electronic device 200 is in a slide-in state and a displayed page when the electronic device 200 is in a slide-out state, according to certain embodiments, FIG. 7C illustrates a third operation switching between a displayed page when the electronic device 200 is in a slide-in state and a displayed page when the electronic device 200 is in a slide-out state, according to certain embodiments, and FIG. 7D illustrates a fourth operation switching between a displayed page when the electronic device 200 is in a slide-in state and a displayed page when the electronic device 200 is in a slide-out state, according to certain embodiments.

In reference numeral 701 in FIG. 7A, the electronic device 200 may display the first page 411 on the flexible display 230 in the slide-in state. In reference numeral 702 in FIG. 7A, when the flexible display 230 is transitioned to the slide-out state, the electronic device 200 may display the fifth page 511 on the flexible display 230. When the flexible display 230 is transitioned to the slide-out state, the electronic device 200 may display the fifth page 511 on the flexible display 230, which is configured such that the first page 411 is in the main area 401 and at least a portion of the second page 412 is displayed in the expansion area 402.

In certain embodiments, when the flexible display 230 is slid out, the electronic device 200 may display the fifth page 511 on the flexible display 230, which is configured such that the first page 411 is displayed in the main area 401 and columns on the second page 412, corresponding to the width of the expansion area 402, are displayed in the expansion area 402. In reference numeral 703 in FIG. 7B, the electronic device 200 may display the second page 412 on the flexible device 230 in the slide-in state. In reference numeral 704 in FIG. 7B, when the flexible display 230 is transitioned to the slide-out state, the electronic device 200 may display the sixth page 512 on the flexible display 230. When the flexible display 230 is transitioned to the slide-out state, the electronic device 200 may display the sixth page 512 on the flexible display 230, which is configured such that the second page 412 is in the main area 401 and at least a portion of the third page 413 is displayed in the expansion area 402.

In certain embodiments, when the flexible display 230 is transitioned to the slide-out state, the electronic device 200 may display the sixth page 512 on the flexible display 230, which is configured such that the second page 412 is displayed in the main area 401 and columns on the third page 413, corresponding to the width of the expansion area 402, are displayed in the expansion area 402.

In reference numeral 705 in FIG. 7C, the electronic device 200 may display the third page 413 on the flexible display 230 in the slide-in state. In reference numeral 706 in FIG. 7C, when the flexible display 230 is transitioned to the slide-out state, the electronic device 200 may display the seventh page 513 on the flexible display 230. When the flexible display 230 is transitioned to the slide-out state, the electronic device 200 may display the seventh page 513 on the flexible display 230, which is configured such that the third page 413 is displayed in the main area 401 and at least a portion of the fourth page 414 is displayed in the expansion area 402.

In certain embodiments, when the flexible display 230 is transitioned to the slide-out state, the electronic device 200 may display the seventh page 513 on the flexible display 230, which is configured such that the third page 413 is displayed in the main area 401 and columns on the fourth page 414, corresponding to the width of the expansion area 402, are displayed in the expansion area 402.

In reference numeral 707 in FIG. 7D, the electronic device 200 may display the fourth page 414 on the flexible display 230 in the slide-in state. In reference numeral 708 in FIG. 7D, when the flexible display 230 is transitioned to the slide-out state, the electronic device 200 may display the eighth page 514 on the flexible display 230. When the flexible display 230 is transitioned to the slide-out state, the electronic device 200 may display the eighth page 514 on the flexible display 230, which is configured such that the fourth page 414 is displayed in the main area 401 and at least a portion of the first page 411 is displayed in the expansion area 402. The eighth page 514, which is the last page among the plurality of pages, may include the fourth page 414 and at least a portion of the first page 411 which is the first page, but is not limited thereto. For example, although not shown, the electronic device 200 may display the fourth page 414 in the main area 401 and include a blank page in the expansion area 402. The blank page may mean, for example, a page that does not include an icon, an application, an item, and an image.

In certain embodiments, when the flexible display 230 is transitioned to the slide-out state, the electronic device 200 may display the eighth page 514 on the flexible display 230, which is configured such that the fourth page 414 is in the main area 401 and columns on the first page 411, corresponding to the width of the expansion area 402, are displayed in the expansion area 402, based on the number of columns included in the matrix thereof.

In certain embodiments, when the flexible display 230 is transitioned to the slide-out state, the electronic device 200 may display the fourth page 414 in the main area 401 and a blank page in the expansion area 402.

Certain embodiments have been described based on when the fourth page 414 is the last page, but if the electronic device 200 includes more or fewer pages than the number of pages including the fourth page 414, the last page may be different.

Figure 8A:
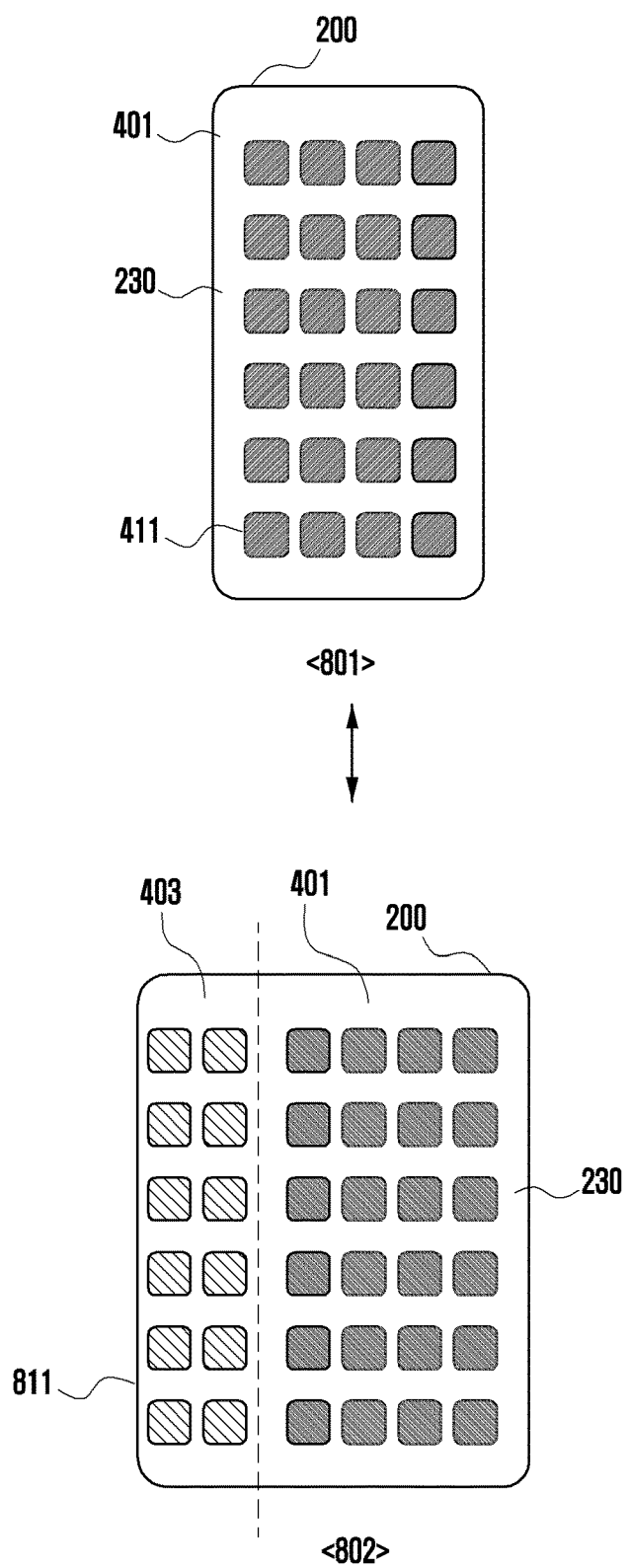
FIG. 8A illustrates a first operation switching between a displayed page when an electronic device is in a slide-in state and a displayed page when the electronic device is in a slide-out state, according to certain embodiments.
Figure 8B:
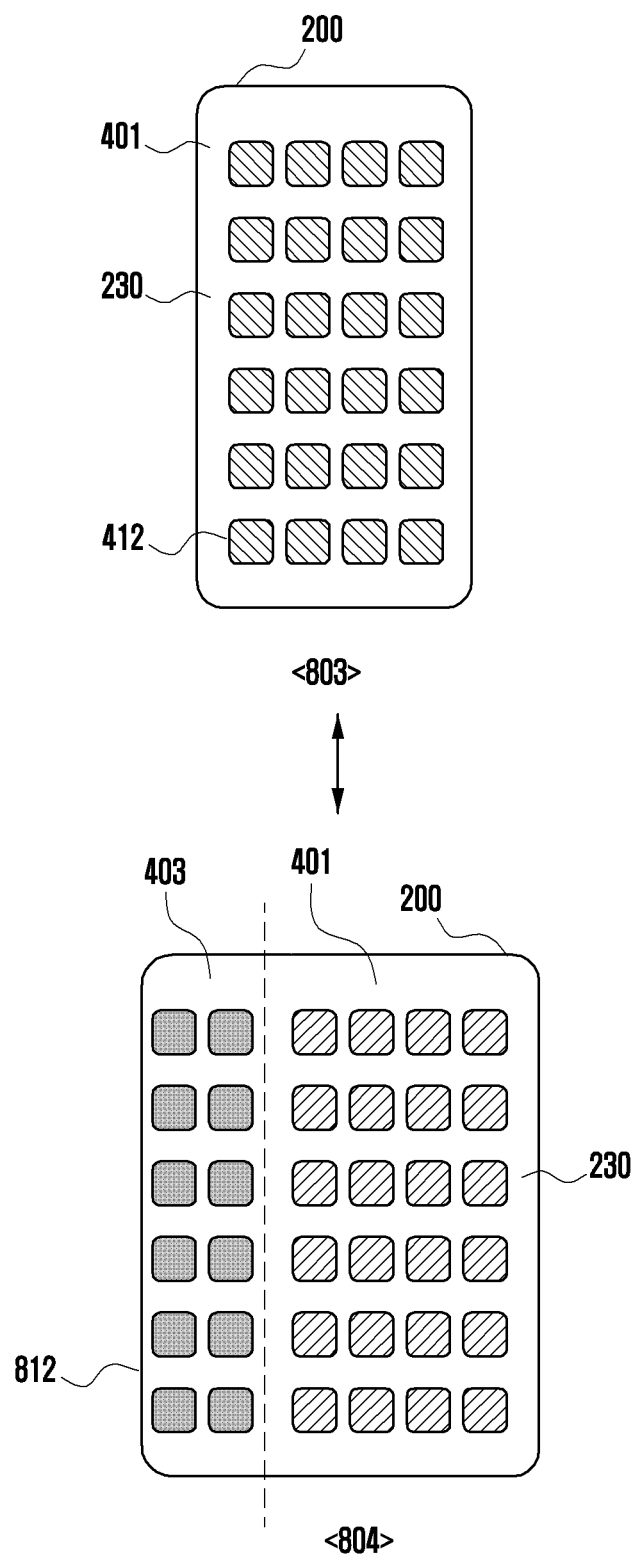
FIG. 8B illustrates a second operation switching between a displayed page when an electronic device is in a slide-in state and a displayed page when the electronic device is in a slide-out state, according to certain embodiments.

FIG. 8A illustrates a first operation switching between a displayed page when the electronic device 200 is in a slide-in state and a displayed page when the electronic device 200 is in a slide-out state, according to certain embodiments, and FIG. 8B illustrates a second operation switching between a displayed page when the electronic device 200 is in a slide-in state and a displayed page when the electronic device 200 is in a slide-out state, according to certain embodiments.

The expansion area 403 of FIG. 8A and/or FIG. 8B may be disposed on the left side of the main area 401 whereas the expansion area 402 of FIG. 7A is disposed on the right side of the main area 401.

In FIGS. 8A and 8B, the slide-out operation of the electronic device 200 may be an operation in which the flexible display 230 is slid out in the leftward direction thereof in the slide-in state.

In certain embodiments, at least one icon may be displayed in the form of a page having a matrix (for example, M×(N+K) matrix) in the main area 401 and/or the expansion area 403 when the flexible display 230 of the electronic device 200 is in the slide-out state. At least some of icons displayed in the expansion area 403 may be displayed to be distinguished from at least some of icons displayed in the main area 401.

In certain embodiments, the main area 401 of the electronic device 200 may be displayed in an M×N matrix form, and the expansion area 403 may be displayed in an M×K matrix form.

In certain embodiments, in the M×N matrix and the M×K matrix, N and K are integers greater than or equal to 1, and K may be a number less than or equal to N. For example, if N is 4, K may be one of 4, 3, 2, and 1. If the M×N matrix includes 4 columns, the M×K matrix may include at least one of 4 columns, 3 columns, 2 columns, and 1 column. Page I may be displayed in the main area 401, and at least some of icons included on page I+1, for example, the M×K matrix on page I+1 may be displayed in the expansion area 403.

In reference numeral 801 in FIG. 8A, the electronic device 200 in the slide-in state may display the first page 411 on the flexible display 230. In reference numeral 802 in FIG. 8A, when the flexible display 230 is transitioned to the slide-out state, the electronic device 200 may display a ninth page 811 on the flexible display 230.

When the flexible display 230 is transitioned to the slide-out state, the ninth page 811 configured such that the first page 411 is displayed in the main area 401 and at least a portion of the second page 412 is displayed in the expansion area 403 may be displayed on the flexible display 230.

In certain embodiments, when the flexible display 230 is transitioned to the slide-out state, the ninth page 811 configured such that the first page 411 is displayed in the main area 401 and columns on the second page 412, corresponding to the width of the expansion area 403, are displayed in the expansion area 403 may be displayed on the flexible display 230.

In reference numeral 803 in FIG. 8B, the electronic device 200 in the slide-in state may display the second page 412 on the flexible display 230. In reference numeral 804 in FIG. 8B, when the flexible display 230 is transitioned to the slide-out state, the electronic device 200 may display a tenth page 812 on the flexible display 230. When the flexible display 230 is transitioned to the slide-out state, the electronic device 200 may display the tenth page 812 on the flexible display 230, which is configured such that the second page 412 is displayed in the main area 401 and at least a portion of the third page 413 is displayed in the expansion area 403.

In certain embodiments, when the flexible display 230 is transitioned to the slide-out state, the electronic device 200 may display the tenth page 812 on the flexible display 230, which is configured such that the second page 412 is displayed in the main area 401 and columns on the third page 413, corresponding to the width of the expansion area 403, are displayed in the expansion area 403.

Figure 9A:
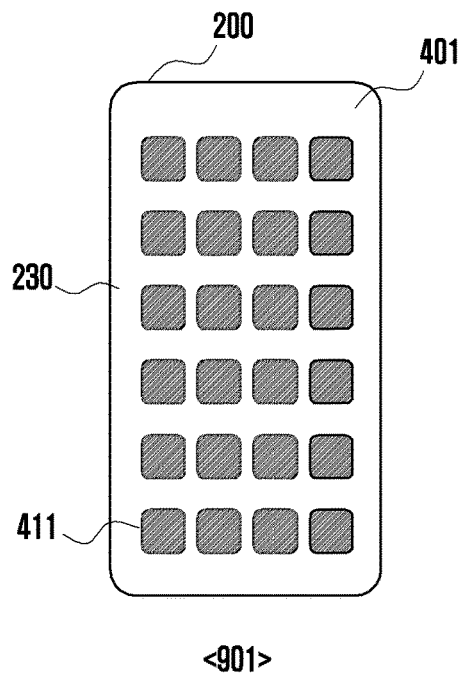
FIG. 9A illustrates a first operation switching between a displayed page when an electronic device is in a slide-in state and a displayed page when the electronic device is in a slide-out state, according to certain embodiments.
Figure 9A:
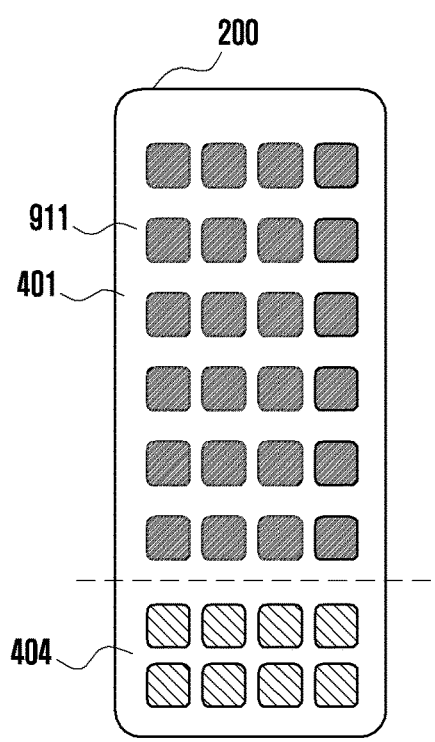
Figure 9B:
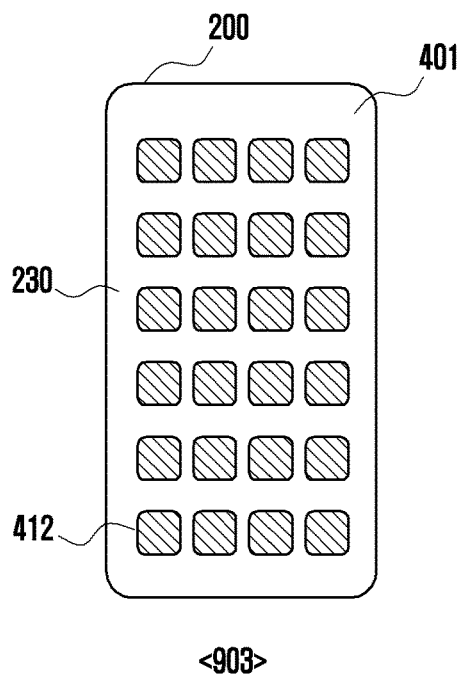
FIG. 9B illustrates a second operation switching between a displayed page when an electronic device is in a slide-in state and a displayed page when the electronic device is in a slide-out state, according to certain embodiments.
Figure 9B:
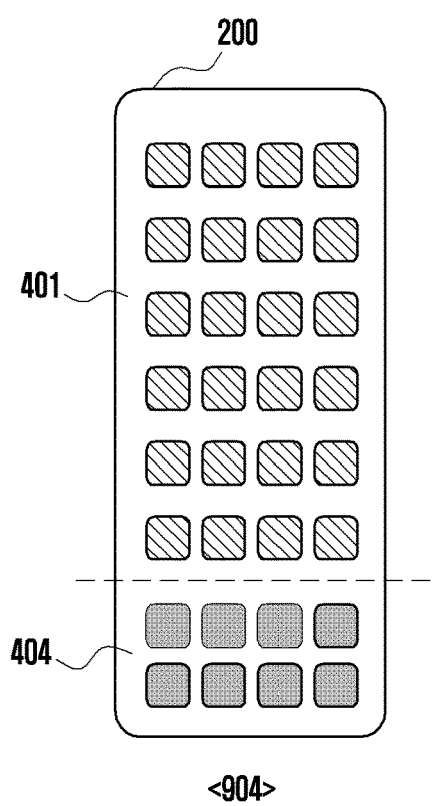

FIG. 9A illustrates a first operation switching between a displayed page when the electronic device 200 is in a slide-in state and a displayed page when the electronic device 200 is in a slide-out state, according to certain embodiments, and FIG. 9B illustrates a second operation switching between a displayed page when the electronic device 200 is in a slide-in state and a displayed page when the electronic device 200 is in a slide-out state, according to certain embodiments.

An expansion area 404 of FIG. 9A and/or FIG. 9B may be disposed below the main area 401 whereas the expansion area 402 of FIGS. 7A to 7D and/or the expansion area 403 of FIGS. 8A to 8B are disposed on the left and right of the main area 401. In FIGS. 9A and 9B, the slide-out operation of the electronic device 200 may be an operation in which the flexible display 230 is slid out in the downward direction thereof in the slide-in state.

In certain embodiments, the flexible display 230 of the electronic device 200 in the slide-out state may display at least one icon in the form of a page having a matrix (e.g., (M+O)×N matrix) in the main area 401 and/or the expansion area 404. In the electronic device 200, at least some of icons displayed in the expansion area 404 may be displayed to be distinguished from at least some of icons displayed in the main area 401.

In certain embodiments, the main area 401 of the electronic device 200 may be displayed in an M×N matrix form, and the expansion area 404 may be displayed in an O×N matrix form.

In certain embodiments, in the M×N matrix and the O×N matrix, M and O are integers greater than or equal to 1, and O may be a number less than or equal to M. For example, if M is 6, O may be one of 6, 5, 4, 3, 2, 1. If the M×N matrix includes 6 rows, the O×N matrix may include at least one of 6 rows, 5 rows, 4 rows, 3 rows, 2 rows, and 1 row. Page I may be displayed in the main area 401, and at least some of icons included on page I+1, for example, the O×N matrix on page I+1 may be displayed in the expansion area 404.

In reference numeral 901 in FIG. 9A, the electronic device 200 in the slide-in state may display the first page 411 on the flexible display 230. In reference numeral 902 in FIG. 9A, when the flexible display 230 is transitioned to the slide-out state, the electronic device 200 may display an eleventh page 911 on the flexible display 230. When the flexible display 230 is transitioned to the slide-out state, the electronic device 200 may display the eleventh page 911 on the flexible display 230, which is configured such that the first page 411 is displayed in the main area 401 and at least a portion of the second page 412 is displayed in the expansion area 404.

In certain embodiments, when the flexible display 230 is transitioned to the slide-out state, the electronic device 200 may display the eleventh page 911 on the flexible display 230, which is configured such that the first page 411 is displayed in the main area 401 and rows on the second page 412, corresponding to the height of the expansion area 404, are displayed in the expansion area 404, based on the number of rows included in the matrix thereof.

In reference numeral 903 in FIG. 9B, the electronic device 200 in the slide-in state may display the second page 412 on the flexible display 230. In reference numeral 904 in FIG. 9B, when the flexible display 230 is transitioned to the slide-out state, the electronic device 200 may display a twelfth page 912 on the flexible display 230. When the flexible display 230 is transitioned to the slide-out state, the electronic device 200 may display the twelfth page 912 on the flexible display 230, which is configured such that the second page 412 is displayed in the main area 401 and at least a portion of the third page 413 is displayed in the expansion area 404.

In certain embodiments, when the flexible display 230 is transitioned to the slide-out state, the electronic device 200 may display the twelfth page 912 on the flexible display 230, which is configured such that the second page 412 is displayed in the main area 401 and rows on the third page 413, corresponding to the height of the expansion area 404, are displayed in the expansion area 404, based on the number of rows included in the matrix thereof.

Figure 10A:
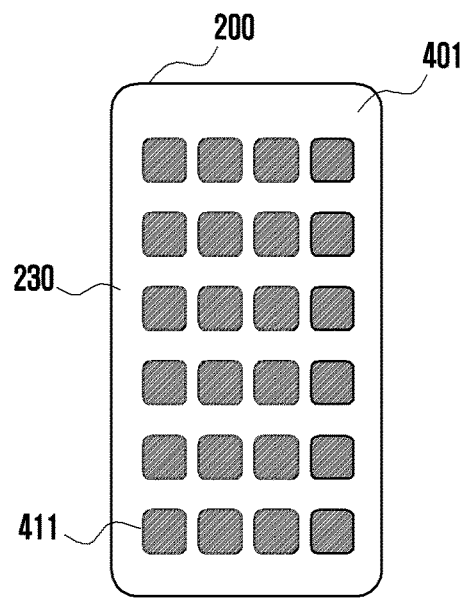
FIG. 10A illustrates a first operation switching between a displayed page when an electronic device is in a slide-in state and a displayed page when the electronic device is in a slide-out state, according to certain embodiments.
Figure 10A:
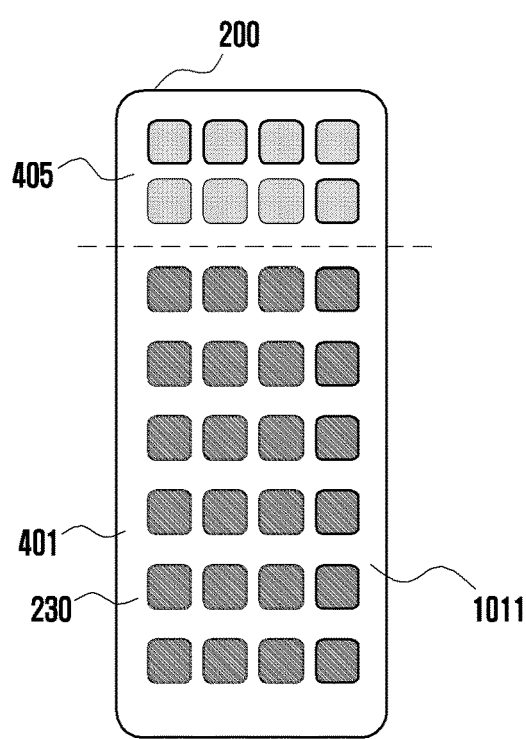
Figure 10B:
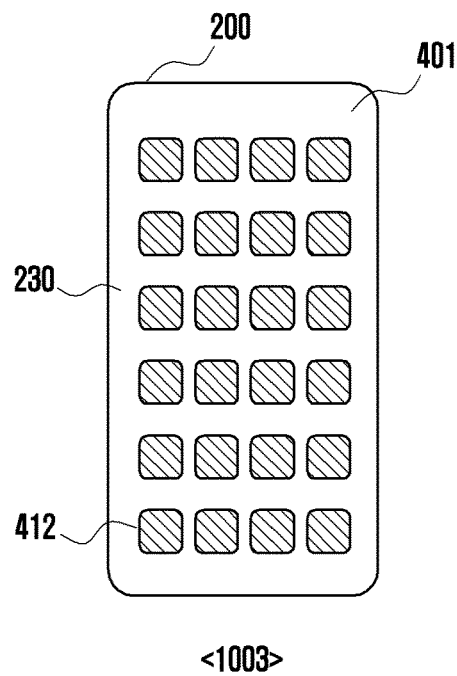
FIG. 10B illustrates a second operation switching between a displayed page when an electronic device is in a slide-in state and a displayed page when the electronic device is in a slide-out state, according to certain embodiments.
Figure 10B:
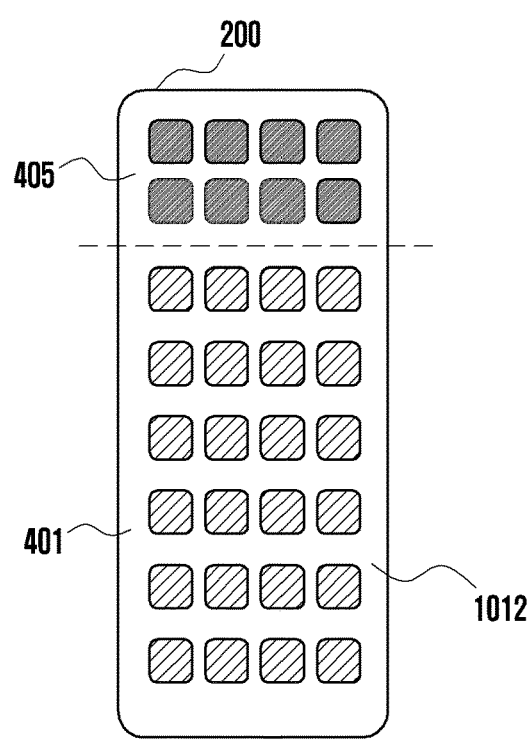

FIG. 10A illustrates a first operation switching between a displayed page when the electronic device 200 is in a slide-in state and a displayed page when the electronic device 200 is in a slide-out state, according to certain embodiments, and FIG. 10B illustrates a second operation switching between a displayed page when the electronic device 200 is in a slide-in state and a displayed page when the electronic device 200 is in a slide-out state, according to certain embodiments.

An expansion area 405 of FIG. 10A and/or FIG. 10B may be disposed above the main area 401 whereas the expansion area 404 of FIG. 9A and/or FIG. 9B is disposed below the main area 401.

In FIGS. 10A and 10B, the slide-out operation of the electronic device 200 may be an operation in which the flexible display 230 is slid out in the upward direction thereof in the slide-in state.

In certain embodiments, the flexible display 230 of the electronic device 200 in the slide-out state may display at least one icon in the form of a page having a matrix (for example, (M+P)×N matrix) in the main area 401 and/or the expansion area 405. At least some of icons displayed in the expansion area 405 may be displayed to be distinguished from at least some of icons displayed in the main area 401.

In certain embodiments, the main area 401 of the electronic device 200 may be displayed in an M×N matrix form, and the expansion area 405 may be displayed in an P×N matrix form.

In certain embodiments, in the M×N matrix and the P×N matrix, M and P are integers greater than or equal to 1, and P may be a number less than or equal to M. For example, if M is 6, P may be one of 6, 5, 4, 3, 2, and 1. If the M×N matrix is 6 rows, the P×N matrix may include at least one of 6 rows, 5 rows, 4 rows, 2 rows, and 1 row. Page I may be displayed in the main area 401, and at least some of icons included on page I+1, for example, an P×N matrix of page I+1 may be displayed in the expansion area 405.

In reference numeral 1001 in FIG. 10A, the electronic device 200 in the slide-in state may display the first page 411 on the flexible display 230. In reference numeral 1002 in FIG. 10A, when the flexible display 230 is transitioned to the slide-out state, the electronic device 200 may display a thirteenth page 1011 on the flexible display 230. When the flexible display 230 is transitioned to the slide-out state, the electronic device 200 may display the thirteenth page 1011 on the flexible display 230, which is configured such that the first page 411 is displayed in the main area 401 and at least a portion of the second page 412 is displayed in the expansion area 405.

In certain embodiments, when the flexible display 230 is transitioned to the slide-out, the electronic device 200 may display the thirteenth page I011 on the flexible display 230, which is configured such that the first page 411 is displayed in the main area 401 and rows on the second page 412, corresponding to the height of the expansion area 405, are displayed in the expansion area 405, based on the number of rows included in the matrix thereof.

In reference numeral 1003 in FIG. 10B, the electronic device 200 in the slide-in state may display the second page 412 on the flexible display 230. In reference numeral 1004 in FIG. 10B, when the flexible display 230 is transitioned to the slide-out state, the electronic device 200 may display a fourteenth page 1012 on the flexible display 230. When the flexible display 230 is transitioned to the slide-out state, the electronic device 200 may display the fourteenth page 1012 on the flexible display 230, which is configured such that the second page 412 is displayed in the main area 401 and at least a portion of the third page 413 is displayed in the expansion area 405.

In certain embodiments, when the flexible display 230 is transitioned to the slide-out state, the electronic device 200 may display the fourteenth page 1012 on the flexible display 230, which is configured such that the second page 412 is displayed in the main area 401 and rows on the third page 413, corresponding to the height of the expansion area 405, are displayed in the expansion area 405, based on the number of rows included in the matrix thereof.

Figure 11A:
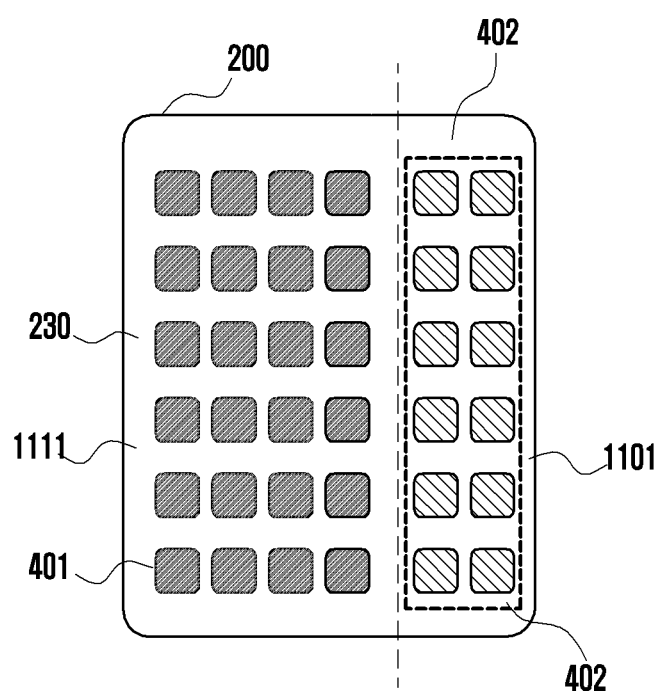
FIG. 11A illustrates a first user interface for a second screen operation when an electronic device is in a slide-out state according to certain embodiments.
Figure 11B:
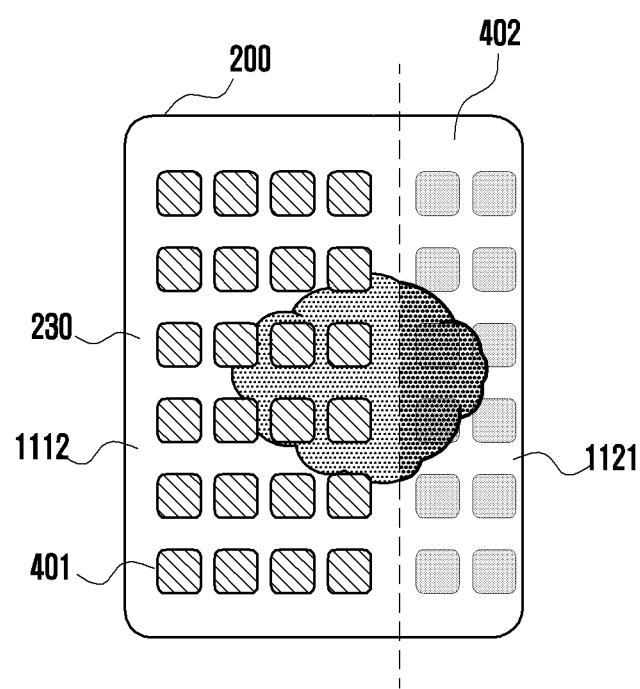
FIG. 11B illustrates a second user interface for the second screen operation when an electronic device is in a slide-out state according to certain embodiments.
Figure 11C:
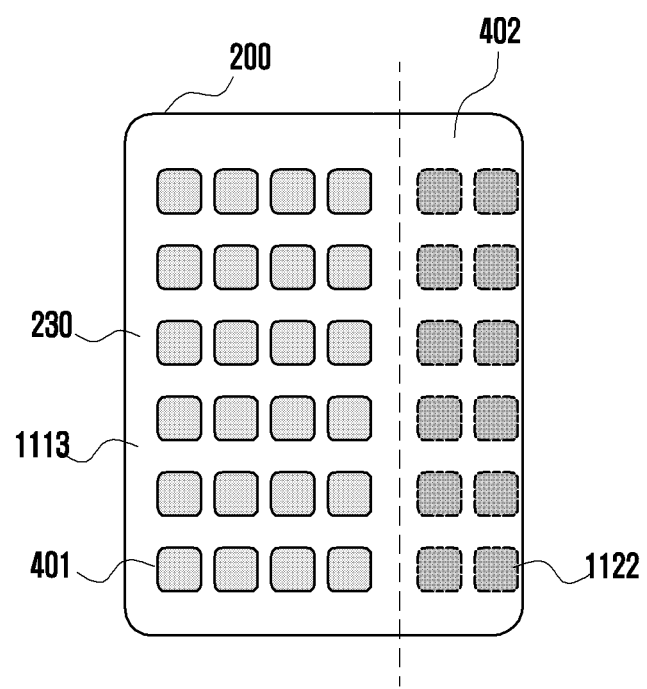
FIG. 11C illustrates a third user interface for the second screen operation when an electronic device is in a slide-out state according to certain embodiments.
Figure 11D:
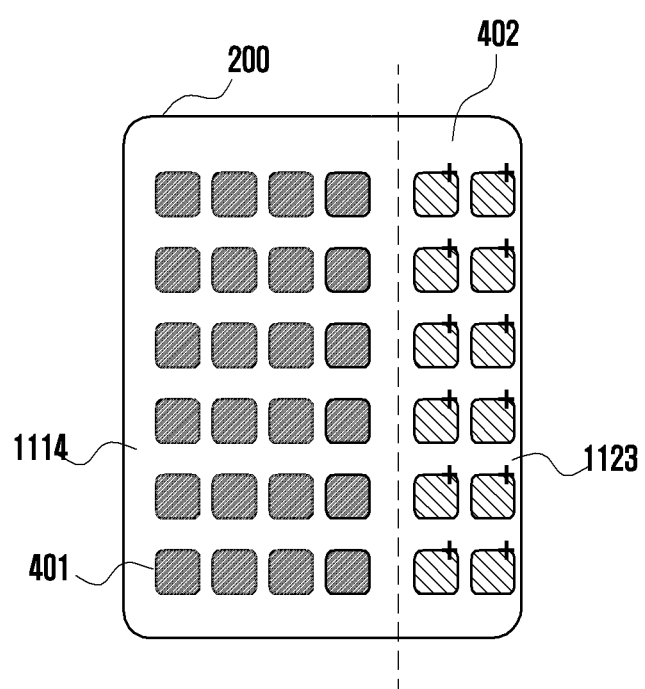
FIG. 11D illustrates a fourth user interface for the second screen operation when an electronic device is in a slide-out state according to certain embodiments.
Figure 11E:
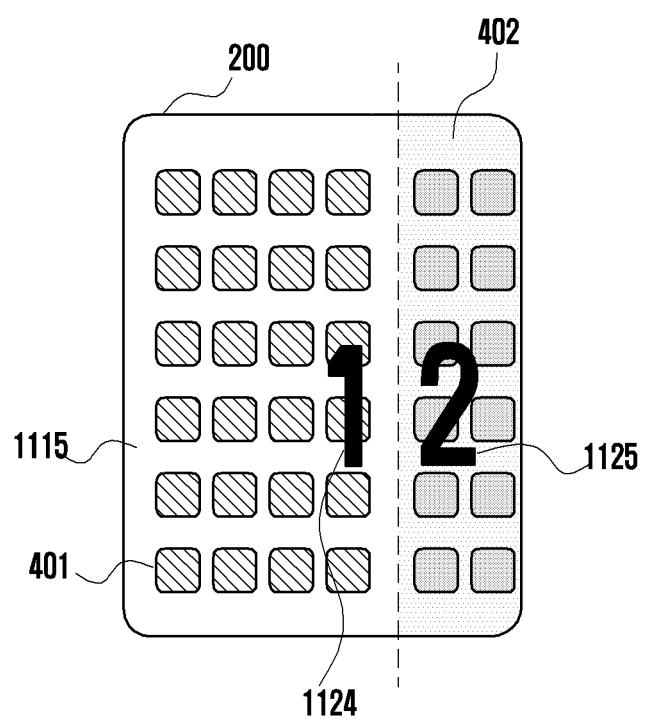
FIG. 11E illustrates a fifth user interface for the second screen operation when an electronic device is in a slide-out state according to certain embodiments.
Figure 11F:
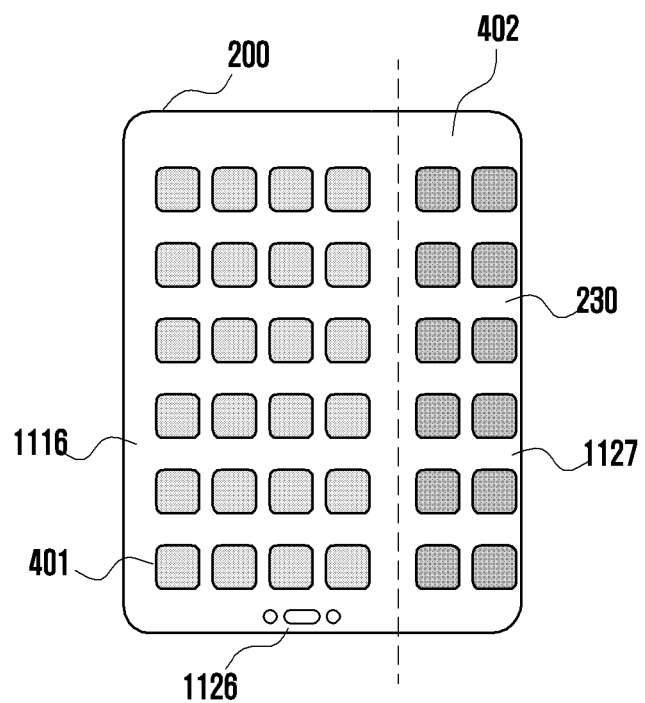
FIG. 11F illustrates a sixth user interface for the second screen operation when an electronic device is in a slide-out state according to certain embodiments.

FIG. 11A illustrates a first user interface for a second screen operation when the electronic device 200 according to certain embodiments is in a slide-out state, FIG. 11B illustrates a second user interface for the second screen operation when the electronic device 200 according to certain embodiments is in a slide-out state, FIG. 11C illustrates a third user interface for the second screen operation when the electronic device 200 according to certain embodiments is in a slide-out state, FIG. 11D illustrates a fourth user interface for the second screen operation when the electronic device 200 according to certain embodiments is in a slide-out state, FIG. 11E illustrates a fifth user interface for the second screen operation when the electronic device 200 according to certain embodiments is in a slide-out state, and FIG. 11F illustrates a sixth user interface for the second screen operation when the electronic device 200 according to certain embodiments is in a slide-out state.

In FIGS. 11A to 11F, the electronic device 200 in the slide-out state according to certain embodiments may display at least one icon in the form of a page 1111 having a matrix (for example, M×(N+L) matrix) in the main area 401 and/or the expansion area 402.

In FIGS. 11A to 11F, according to certain embodiments, the main area 401 may display page I when the electronic device 200 is in the slide-in state. The electronic device 200 in the slide-out state may display the page 1111 displaying page I in the main area 401 and displaying at least some of icons included on page I+1 in the expansion area 402. In this case, the electronic device 200 may display a user interface on the page so that the at least some of icons included on page I+1 displayed in the expansion area 402 can be distinguished from page I displayed in the main area 401.

In certain embodiments, the electronic device 200 may include a free-stop structure related to the flexible display 230. For example, due to the free-stop structure of the electronic device 200, the expansion area 402 may be smaller than the main area 401. The expansion area 402 may have an area smaller than that of the main area 401. Due to the free-stop structure of the electronic device 200, the expansion area 402 may be the same as the main area 401. The expansion area 402 may have the same area as the main area 401.

In FIG. 11A, the electronic device 200 may display a grouping user interface 1101. The grouping user interface 1101 may be a user interface that shades and/or highlights icons displayed in the expansion area 402 and/or the main area 401. The grouping user interface 1101 may be an interface that highlights icons and/or widgets such that pages of icons according to the slide-in state are distinguished.

In FIG. 11B, the electronic device 200 in the slide-out state may display a page 1112 displaying page I in the main area 401 and displaying at least some of icons included on page I+1 in the expansion area 402. The electronic device 200 may display a transparent and/or translucent user interface 1121 on page I+1 in the expansion area 402 so that the at least some of icons included on page I+1 displayed in the expansion area 402 can be distinguished from page I displayed in the main area 401.

In FIG. 11C, the electronic device 200 in the slide-out state may display a page 1113 displaying page I in the main area 401 and displaying at least some of icons included on page I+1 in the expansion area 402. The electronic device 200 may display a user interface 1122 that includes a border line on at least one app icon included on page I+1 in the expansion area 402 so that the at least some of icons included on page I+1 displayed in the expansion area 402 can be distinguished from page I displayed in the main area 401. The user interface 1122, for example, may include an icon border in a dotted line and/or with color.

In FIG. 11D, the electronic device 200 in the slide-out state may display a page 1114 displaying page I in the main area 401 and displaying at least some of icons included on page I+1 in the expansion area 402. The electronic device 200 may display a user interface 1123 for a sub indicator on at least some of icons included on page I+1 in the expansion area 402 so that the at least some of icons included on page I+1 displayed in the expansion area 402 can be distinguished from page I displayed in the main area 401.

The user interface 1123 for a sub-indicator may be, for example, a badge formed on the periphery of an icon. The user interface 1123 for a sub-indicator may be formed in a different layer so as to at least partially overlap the icon. The user interface 1123 for a sub-indicator may be text and/or an image.

In FIG. 11E, the electronic device 200 in the slide-out state may display a page 1115 displaying page I in the main area 401 and displaying at least some of icons included on page I+1 in the expansion area 402. The electronic device 200 may display user interfaces 1124 and 1125 for a numbering guide of page I displayed in the main area 401 and page I+1 in the expansion area 402 so that the at least a portion of page I+1 displayed in the expansion area 402 can be distinguished from page I displayed in the main area 401. The user interfaces 1124 and 1125 for a numbering guide may be, for example, an image and/or text that indicates numbers in each of the main area 401 and/or the expansion area 402.

In FIG. 11F, the electronic device 200 in the slide-out state may display a page 1116 displaying page I in the main area 401 and displaying at least some of icons included on page I+1 in the expansion area 402. The electronic device 200 in the slide-out state may display a user interface 1126 for a page indicator indicating page number to which the icons displayed in the expansion area 402 belongs. The user interface 1126 for the page indicator may be implemented as, for example, a plurality of bars, dots, and/or lines, and highlight bars, dots and/or lines corresponding to the current page.

Figure 12A:
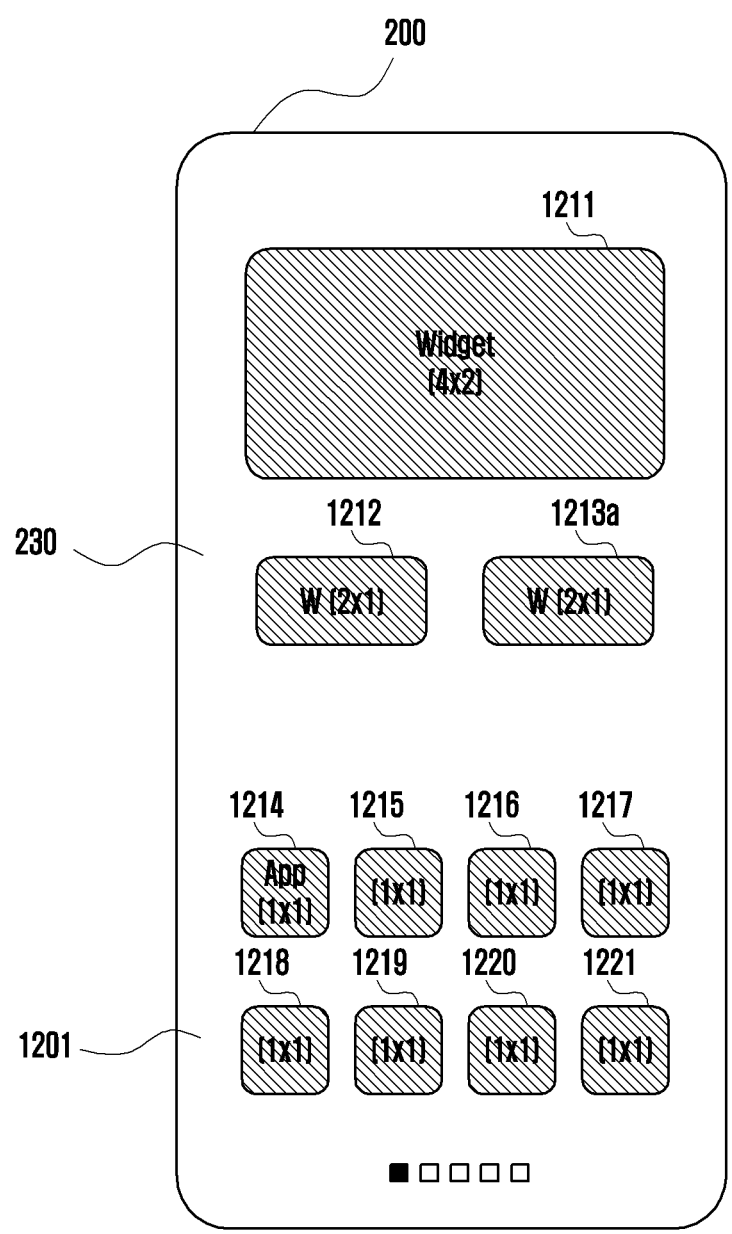
FIG. 12A illustrates a first user interface for a home screen and/or an app tray of an electronic device according to certain embodiments.
Figure 12B:
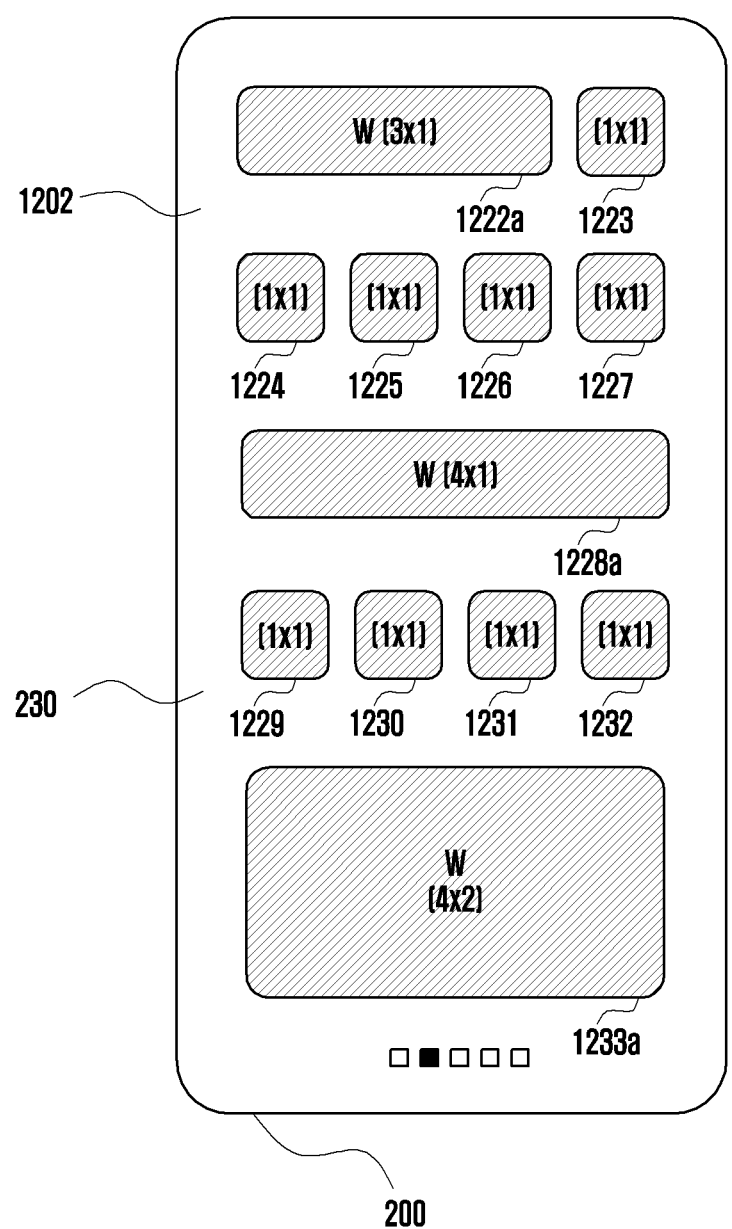
FIG. 12B illustrates a second user interface for the home screen and/or app tray of an electronic device according to certain embodiments.
Figure 12C:
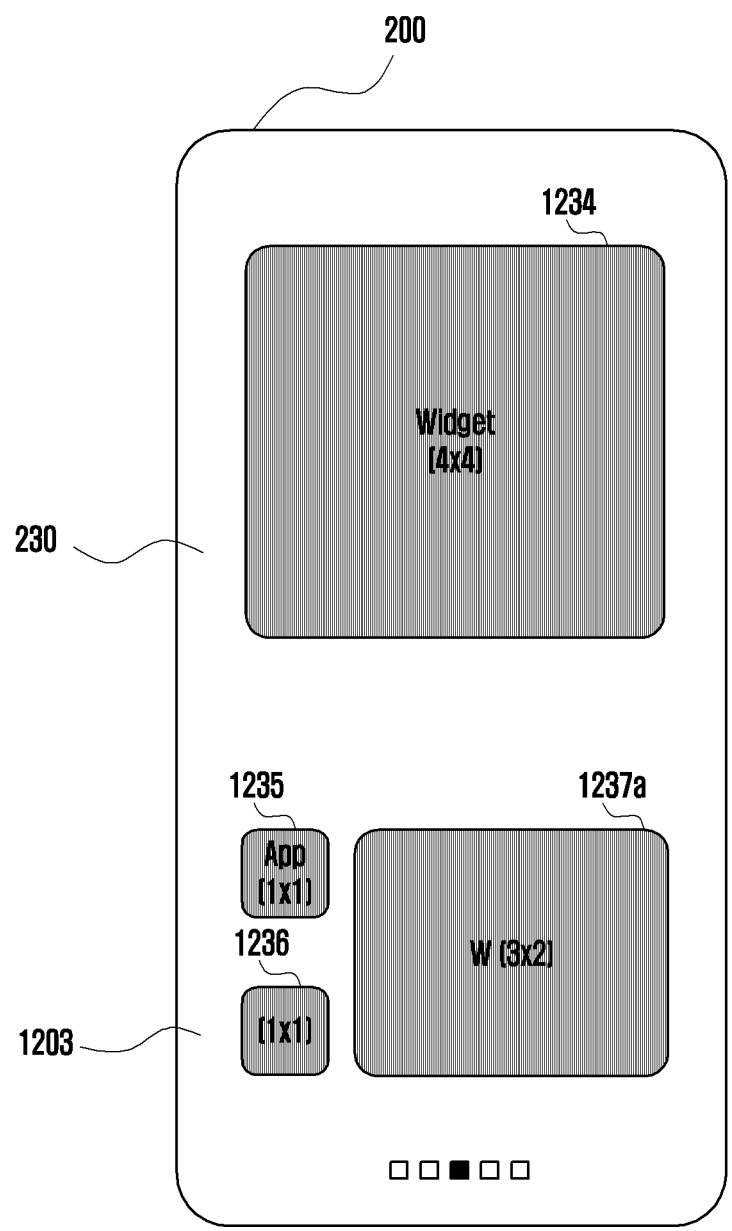
FIG. 12C illustrates a third user interface for the home screen and/or app tray of an electronic device according to certain embodiments.

FIG. 12A illustrates a first interface of a home screen and/or an app tray of the electronic device 200 according to certain embodiments, FIG. 12B illustrates a second interface of the home screen and/or app tray of the electronic device 200 according to certain embodiments, and FIG. 12C illustrates a third interface of the home screen and/or app tray of the electronic device 200 according to certain embodiments.

In FIG. 12A, the electronic device 200 according to certain embodiments may display one or more applications 1211, 1212, and 1213a and one or more icons 1214, 1215, 1216, 1217, 1218, 1219, 1220, and 1221 on the flexible display 230 in the slide-in state as a fifteenth page 1201 in a matrix form. The one or more applications 1211, 1212, and 1213a may be a widget application.

In certain embodiments, FIG. 12A may illustrate page I of the electronic device 200, FIG. 12B may illustrate page I+1 of the electronic device 200, and FIG. 12C may illustrate page I+2 of the electronic device 200. For example, FIG. 12A may illustrate the fifteenth page I201 of the electronic device 200, FIG. 12B may illustrate a sixteenth page I202 of the electronic device 200, and FIG. 12C may illustrate a seventeenth page I203 of the electronic device 200.

In certain embodiments, the home screen and/or the app tray may include a plurality of pages including pages in a matrix form. The home screen and/or the app tray as the main screen of the electronic device 200 may include, for example, a dock at the edge of the screen (e.g., lower end).

The widget applications may have a predetermined size. The predetermined size be expressed as the number of rows and columns occupied by a matrix form. The first widget 1211 may have a 2×4 size, and the second widget 1212 and the third widget 1213a may have a 2×1 size. Each of the one or more icons 1214, 1215, 1216, 1217, 1218, 1219, 1220, and 1221 may have a 1×1 size.

In FIG. 12B, the electronic device 200 in a slide-in state according to certain embodiments may display one or more applications 1222a, 1228a, and 1233a and one or more icons 1223, 1224, 1225, 1226, 1227, 1229, 1230, 1231, and 1232 on the flexible display 230 on the sixteenth page I202 in a matrix form. The one or more applications 1222a, 1228a, and 1233a may be a widget application.

The widget applications may have a predetermined size. The predetermined size may be expressed as the number of rows and columns occupied by a matrix form. The fourth widget 1222a, the fifth widget 1228a, and the sixth widget 1233a may have a 3×1, 4×1, and 4×2 size, respectively. Each of the one or more icons 1223, 1224, 1225, 1226, 1227, 1229, 1230, 1231, and 1232 may have a 1×1 size.

In FIG. 12C, when the electronic device 200 according to certain embodiments is in the slide-in state, one or more applications 1234 and 1237a and one or more icons 1235 and 1236 may be displayed on the flexible display 230 in the form of the seventeenth page 1203 having a matrix.

The widget applications may have a predetermined size. The predetermined size may be expressed as the number of rows and columns occupied by a matrix form. The one or more applications 1234 and 1237a may be a widget application. The seventh widget 1234 and the eighth widget 1237a may have a 4×4 and 3×2 size, respectively. Each of the one or more icons 1235 and 1236 may have a 1×1 size. The electronic device 200 may include the fifteenth page 1201, the sixteenth page 1202, and the seventeenth page 1203, and the pages may change according to a user input.

Figure 13A:
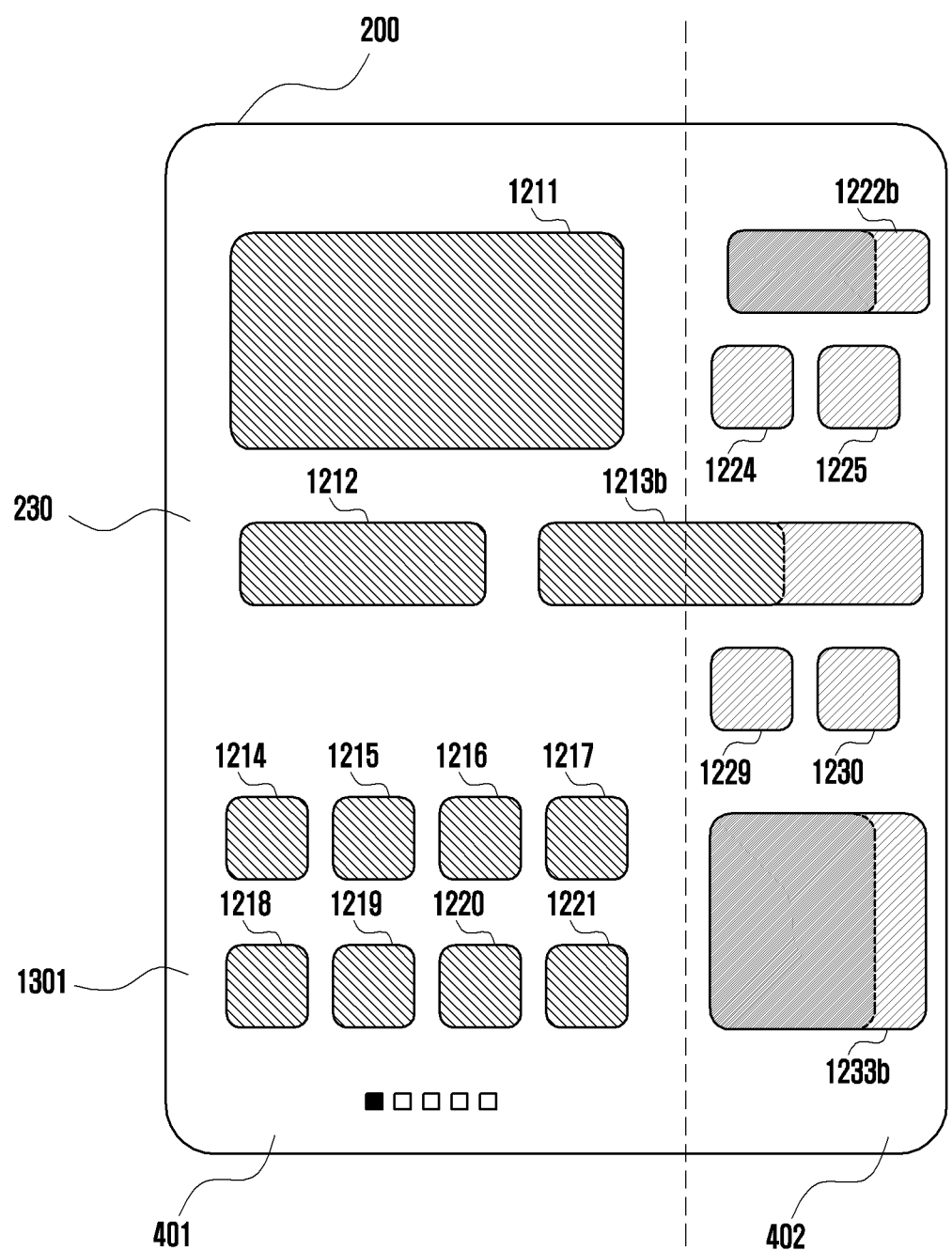
FIG. 13A illustrates a method for operating a home screen and/or an app tray of an electronic device according to certain embodiments.
Figure 13B:
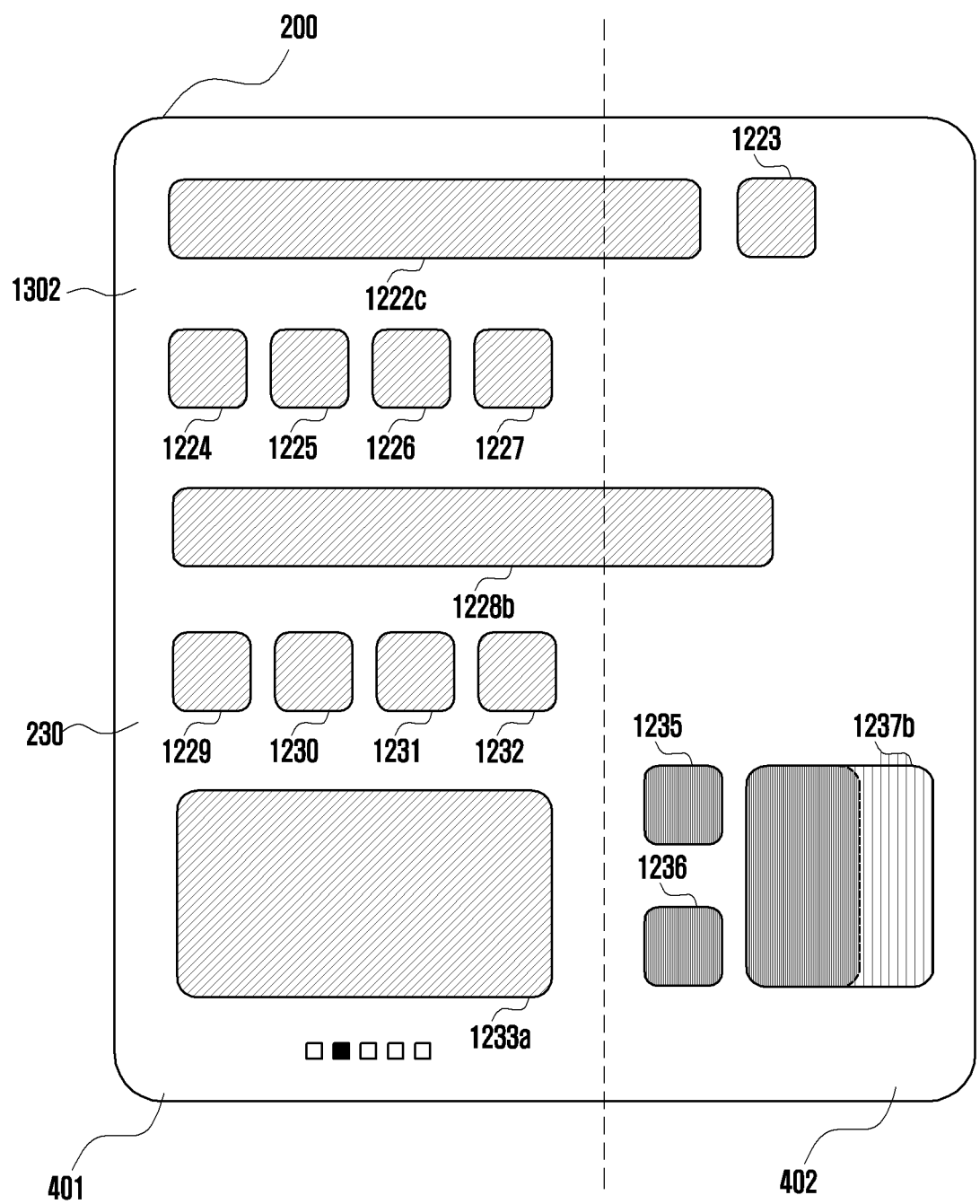
FIG. 13B illustrates a method for operating a home screen and/or an app tray of an electronic device according to certain embodiments.

FIG. 13A illustrates a method for operating a home screen and/or an app tray of the electronic device 200 according to certain embodiments, and FIG. 13B illustrates a method for operating a home screen and/or an app tray of an electronic device 200 according to certain embodiments.

Referring to FIGS. 12A to 12C, and 13A and 13B, FIGS. 12A to 12C illustrate the home screen and/or the app tray operation when the electronic device 200 is in the slide-in state, and FIGS. 13A and 13B illustrate the home screen and/or the app tray operation when the electronic device 200 is in the slide-out state.

In certain embodiments, the home screen and/or the app tray may include a plurality of pages including pages in matrix form. The home screen and/or the app tray as the main screen of the electronic device 200 may include, for example, a dock at the edge of the screen, for example, at the lower end.

When the flexible display 230 is slid out by the slide-out of the electronic device 200, the electronic device 200 may display page I in the main area 401 and display at least some widgets included on page I+1 in the expansion area 402 by resizing the widgets.

In certain embodiments, if the electronic device 200 includes a 3×1 size widget on page I+1 when it is in the slide-in state, the electronic device 200 may display the 3×1 size widget included on page I+1 in the expansion area 402 in the slide-out state by resizing the widget to a 2×1 size.

In certain embodiments, the electronic device 200 may display the widgets included in the first column and/or the second column of page I+1 in the expansion area 402 by resizing the widgets. For example, when an icon is included on page I+1, the electronic device 200 may display the icon in the expansion area 402 without resizing the icon.

In certain embodiments, when the widget included in the first column and/or the second column of page I+1 is displayed in the expansion area 402 and has a size exceeding 2 columns, but the widget does not support resizing, the electronic device 200 may expand the widget of page I displayed in the main area 401 to the expansion area 402. When the expansion area 402 is a blank area without the first column and/or the second column of page I+1, the electronic device 200 may expand the widget of page I displayed in the main area 401 to the expansion area 402.

For example, when there is one widget included on page I and the electronic device 200 expands the widget of page I to be displayed in the main area 401 and the expansion area 402, the widget may be resized to the maximum size (for example, 6 rows).

In certain embodiments, when the electronic device 200 includes a plurality of widgets on page I and the electronic device 200 expands the widgets of page I to be displayed in the main area 401 and the expansion area 402, the electronic device 200 may expand each of the widgets at the same ratio.

For example, when page I includes a 2×1 widget and a 2×1 widget when the electronic device 200 expands the widgets of page I to the expansion area 402, the widgets may be expanded at the same ratio to a 3×1 widget and a 3×1 widget, respectively.

In certain embodiments, when the electronic device 200 cannot expand the respective widgets of the plurality of widgets included on page I at the same ratio when the electronic device expands the widgets of page I displayed on the main area 401 to the expansion area 402, the widget included in the left column may be expanded preferentially.

In certain embodiments, if the widget of page I displayed in the main area 401 cannot be expanded to the expansion area 402, the electronic device 200 may align the corresponding row at the center thereof.

In certain embodiments, if the widget of page I displayed in the main area 401 cannot be expanded to the expansion area 402 and cannot be aligned at the center, the electronic device 200 may maintain the existing arrangement of page I.

In FIG. 13A, the electronic device 200 in the slide-out state may display the eighteenth page 1301 including the fifteenth page 1201 and at least a portion of the sixteenth page 1202 in the main area 401 and the expansion area 402, respectively. In this case, when the flexible display 230 is slid out, the eighteenth page 1301 may display one or more applications 1211, 1212, and 1213b and one or more icons 1214, 1215, 1216, 1217, 1218, 1219, 1220, and 1221 in the main area 401. The third widget 1213a may be resized to be displayed as an expanded third widget 1213b. The expanded third widget 1213b may be displayed not only in the main area 401 but also in the expansion area 402.

In certain embodiments, if the widget of page I displayed in the main area 401 cannot be expanded to the expansion area 402, the electronic device 200 may align the corresponding row at the center thereof.

In certain embodiments, if the widget of page I displayed in the main area 401 cannot be expanded to the expansion area 402 and cannot be aligned at the center thereof, the electronic device 200 may maintain the existing arrangement of page I.

For example, one or more applications and/or icons 1211, 1212, 1214, 1215, 1216, 1217, 1218, 1219, 1220, and 1221 of the fifteenth page 1201, which cannot be expanded to the expansion area 402, may be retained in the arrangement before the slide-out of the electronic device 200.

The expansion area 402 may display one or more applications 1222b and 1233b and one or more icons 1224, 1225, 1229, and 1230, which are at least a portion of the sixteenth page 1202.

In certain embodiments, the electronic device 200 may display widgets included in the first column and/or the second column of page I+1 in the expansion area 402 by resizing the widgets. For example, the fourth widget 1222a included on the sixteenth page 1202 may be resized to be displayed as a reduced fourth widget 1222b, and the sixth widget 1233a may be resized to be displayed as a reduced sixth widget 1233b.

In FIG. 13B, the electronic device 200 in the slide-out state may display the nineteenth page 1302 including the sixteenth page I202 and at least a portion of the seventeenth page 1203 in the main area 401 and the expansion area 402, respectively. In this case, when the flexible display 230 is slid out, the nineteenth page 1302 may display one or more applications 1222c, 1228b, and 1233a and one or more icons 1223, 1224, 1225, 1226, 1227, 1229, 1230, 1231, and 1232 in the main area 401. The fourth widget 1222a may be resized to be displayed as an expanded fourth widget 1222c. The fifth widget 1228a may be resized to be displayed as an expanded fifth widget 1228b.

The expanded fourth widget 1222c and/or the expanded fifth widget 1228b may be displayed not only in the main area 401 but also in the expansion area 402. The expansion area 402 may display at least one application 1237b and one or more icons 1235 and 1236, which are at least a portion of the seventeenth page 1203. The eighth widget 1237a may be resized to be displayed as a reduced eighth widget 1237b. The non-reducible seventh widget 1234 is not displayed in the expansion area 402, and in substitute for the seventeenth widget 1234, the icon 1223 included on the sixteenth page 1202 may be moved to the expansion area 402 to be displayed in the expansion area 402.

In certain embodiments, the electronic device 200 may resize the widgets included in the first column and/or the second column of page I+1 to display the same in the expansion area 402. For example, the eighth widget 1237a included in the seventeenth page 1203 may be resized to be displayed as a reduced eighth widget 1237b, and the non-reducible widget 1234 may not be displayed.

Figure 14A:
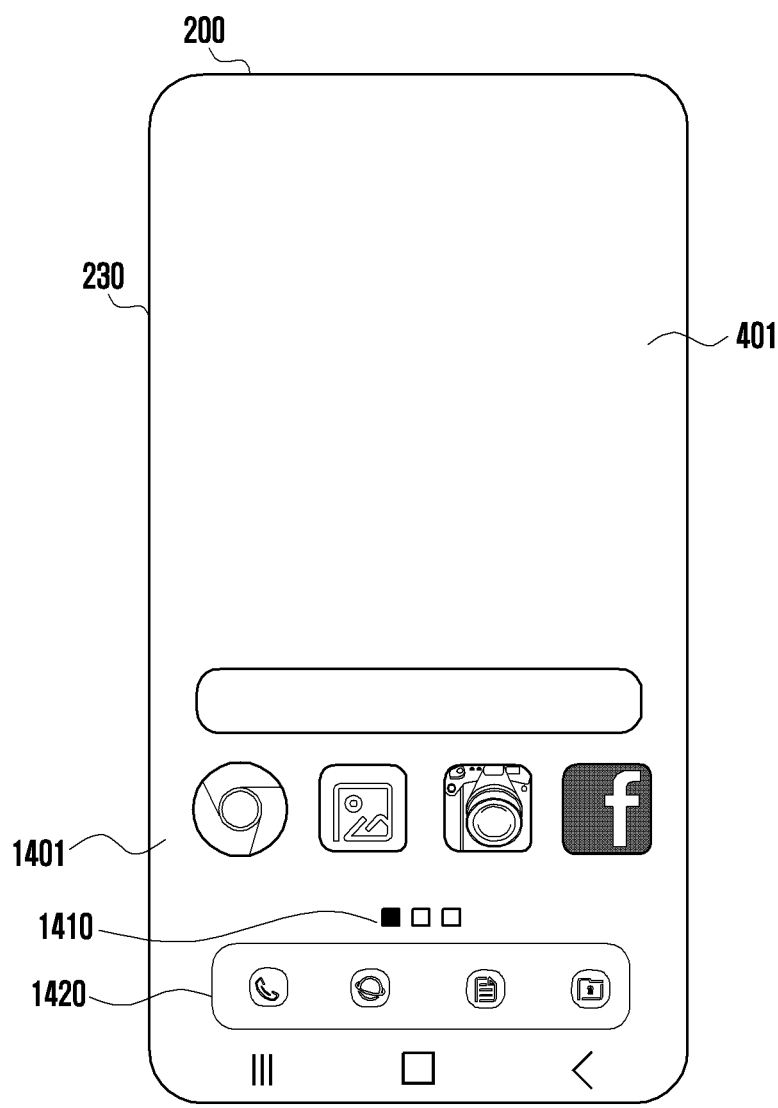
FIG. 14A illustrates a method for operating a screen of an electronic device according to certain embodiments.
Figure 14B:
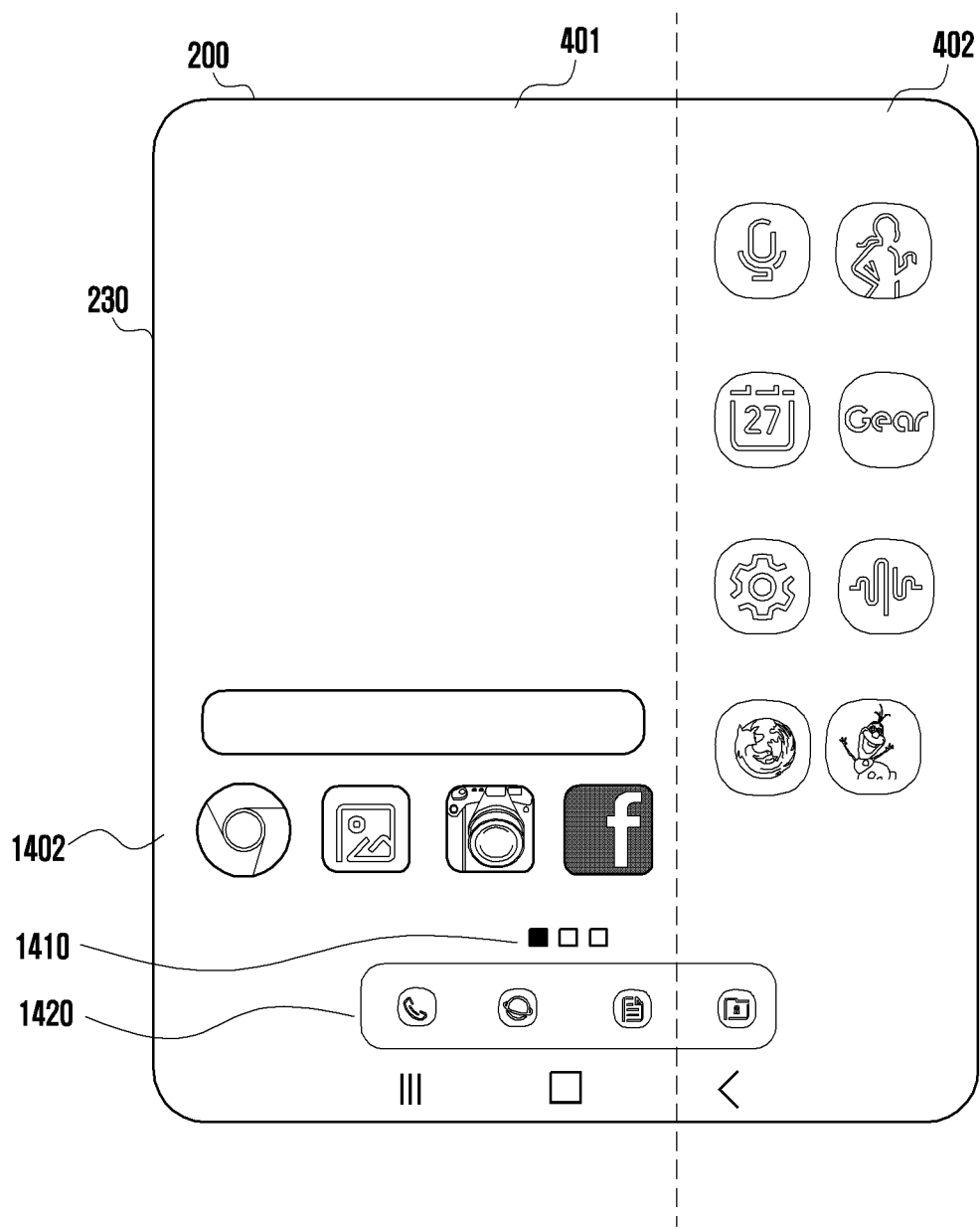
FIG. 14B illustrates a method for operating a screen of an electronic device according to certain embodiments.
Figure 14C:
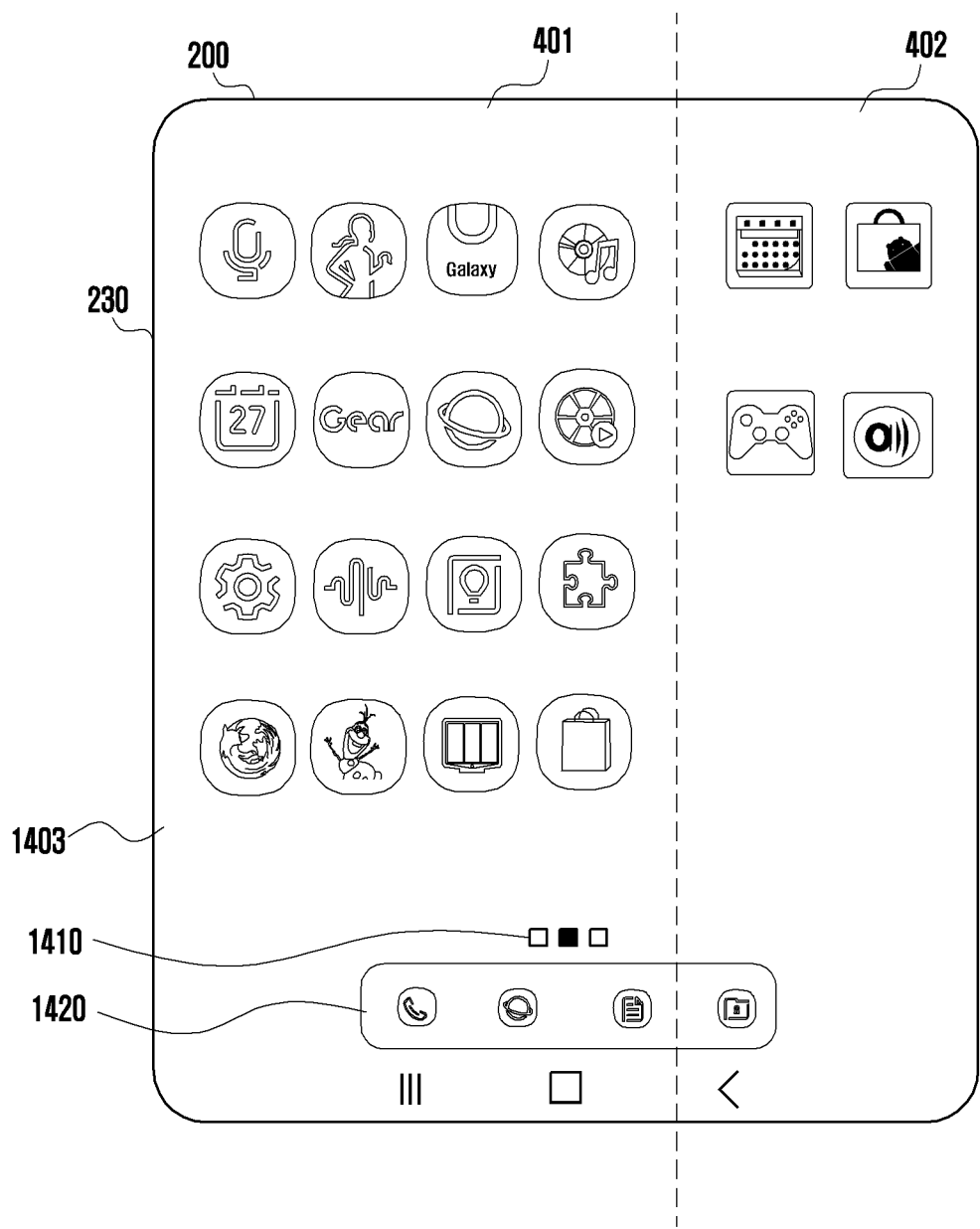
FIG. 14C illustrates a method for operating a screen of an electronic device according to certain embodiments.
Figure 14D:
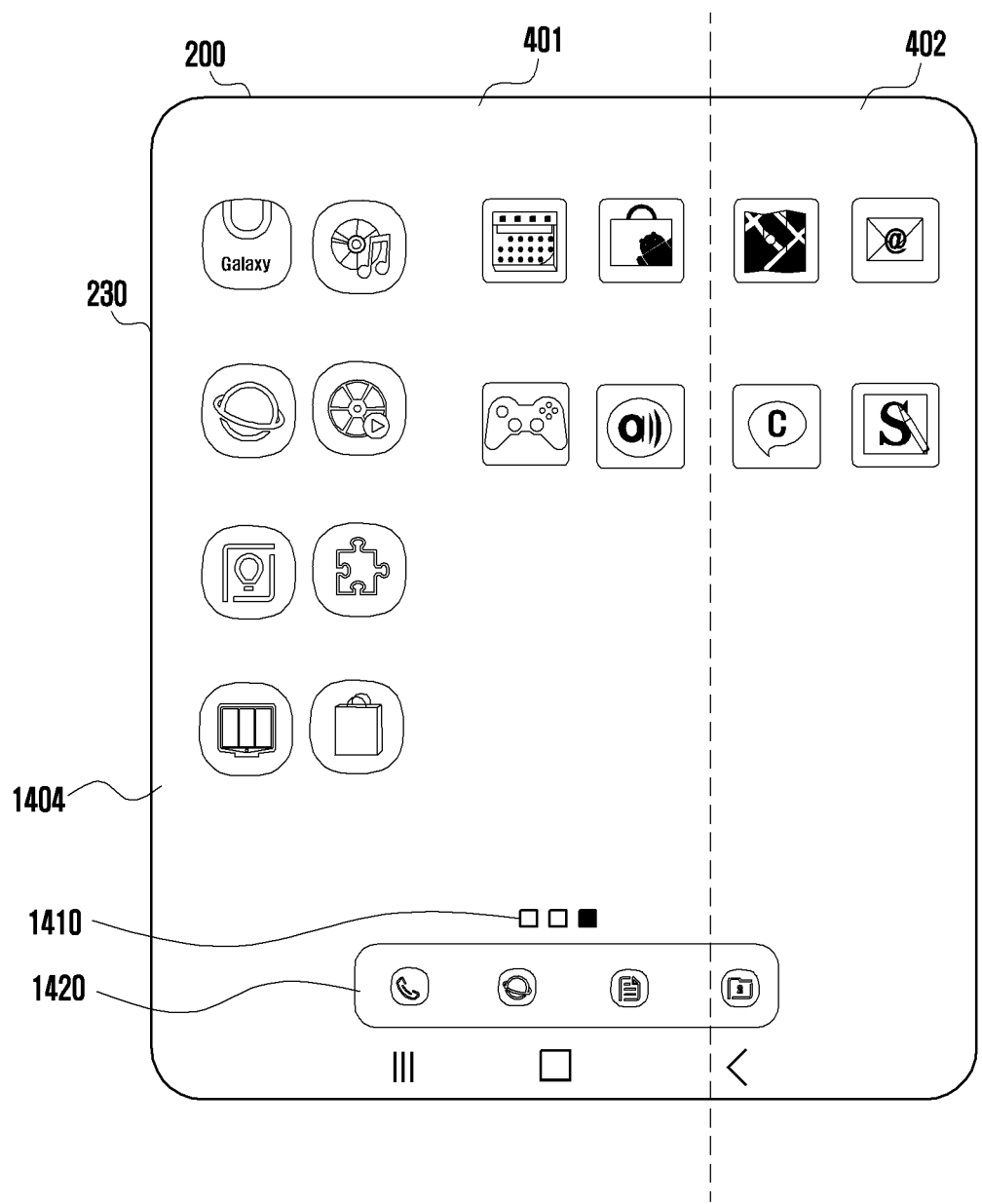
FIG. 14D illustrates a method for operating a screen of an electronic device according to certain embodiments.
Figure 14E:
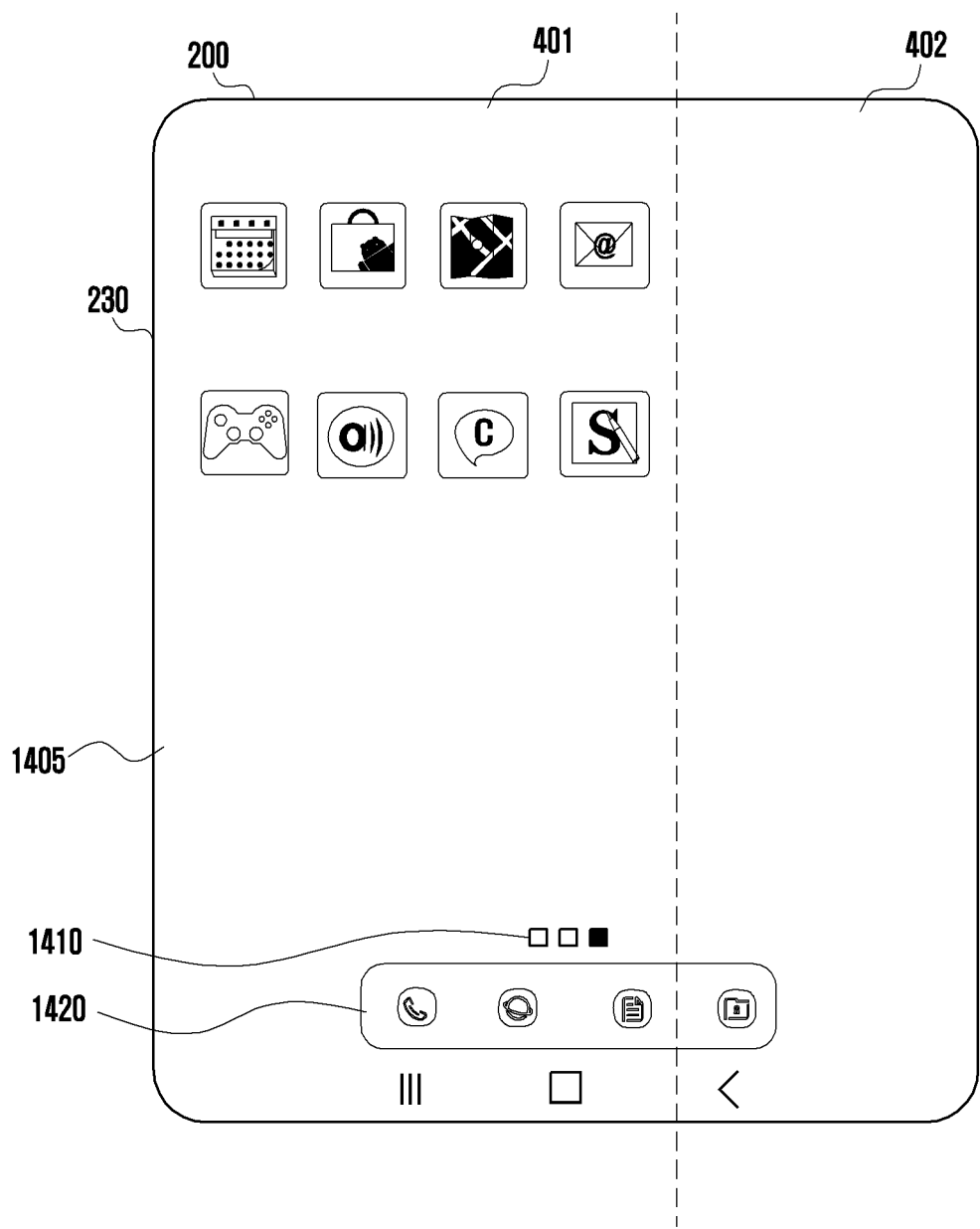
FIG. 14E illustrates a method for operating a screen of an electronic device according to certain embodiments.

FIG. 14A illustrates a method for operating a screen of the electronic device 200 according to certain embodiments, FIG. 14B illustrates a method for operating a screen of the electronic device 200 according to certain embodiments, FIG. 14C illustrates a method for operating a screen of the electronic device 200 according to certain embodiments, FIG. 14D illustrates a method for operating a screen of the electronic device 200 according to certain embodiments, and FIG. 14E illustrates a method for operating a screen of the electronic device 200 according to certain embodiments.

In certain embodiments, the electronic device 200 may display at least one icon, at least one application, at least one item, and/or at least one image in the form of a page having a matrix.

In certain embodiments, the home screen and/or the app tray may include a page indicator 1410. The page indicator 1410 may indicate the page number of the current page or the location of the current page in relation to the plurality of pages. The page indicator 1410 may highlight the page of the home screen and/or the app tray being displayed on the flexible display 230. The home screen and/or the app tray, which is a main screen of the electronic device 200, may include, for example, a dock 1420 at the edge of the screen (e.g., lower end).

In FIG. 14A, the electronic device 200 in the slide-in state may display page I 1401 in a matrix form, including at least one icon, at least one application, at least one item, and/or at least one image, on the flexible display 230. In certain embodiments, the home screen and/or the app tray may include a plurality of pages including pages in a matrix form.

In FIG. 14B, the electronic device 200 in the slide-out state may display a page 1402 including at least a portion of page I+1 and page I in a matrix form including at least one icon, at least one application, at least one item, and/or at least one image, on the flexible display 230. The electronic device 200 may display page I in the main area 401 and display at least some of icons and/or widgets included on page I+1 in the expansion area 402.

In FIG. 14C, the electronic device 200 may display a page 1403 including at least a portion of page I+2 and page I+1 in a matrix form, including at least one icon, at least one application, at least one item, and/or at least one image, on the flexible display 230 in the slide-out state. The electronic device 200 may display page I+1 in the main area 401 and display at least some of icons and/or widgets included on page I+2 in the expansion area 402.

In FIG. 14D, if page I+2 is the last page, page I+2 may be displayed in the expansion area 402 and the main area 401 of the flexible display 230, and page I+1 or a portion thereof may be displayed in the main area 401. In this case, if there is no icon and/or widget included in page I+2, the electronic device 200 may display page I+1 only in the main area 401, and no icon and/or widget may be displayed in the expansion area 402 as shown in FIG. 14E.

Figure 15:
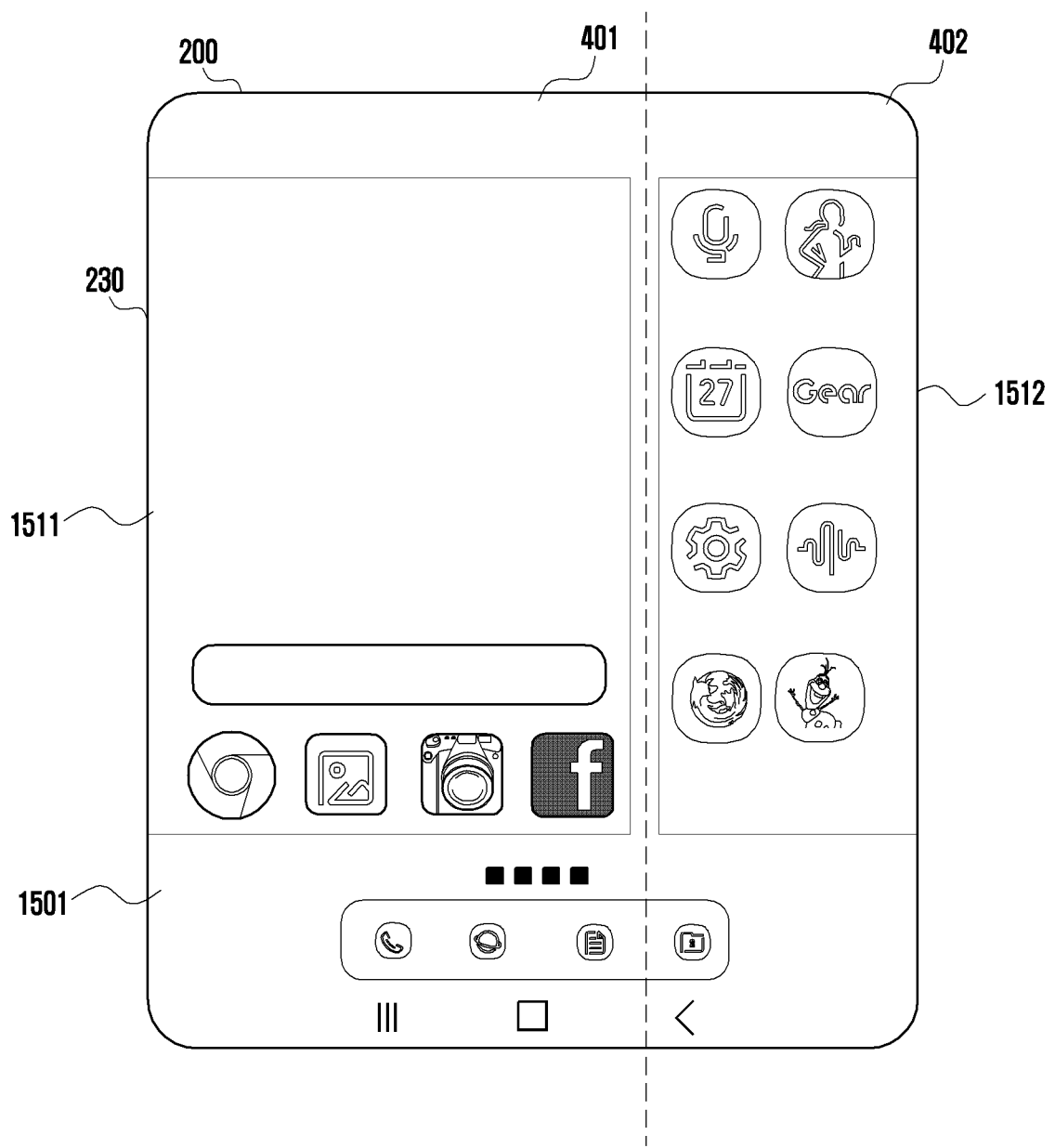
FIG. 15 illustrates a method of a second screen operation when an electronic device is in a slide-out state according to certain embodiments.

FIG. 15 illustrates a method of a second screen operation when the electronic device 200 is in a slide-out state according to certain embodiments.

The electronic device 200 may display grouping user interfaces 1511 and 1512 on the flexible display 230 so that at least a portion of page I+1 displayed in the expansion area 402 can be distinguished from page I displayed in the main area 401. The grouping user interface 1512 may be a user interface that shades and/or highlights the icons and/or widgets displayed in the expansion area 402 and/or the main area 401. The grouping user interface 1512 may be an interface that highlights icons and/or widgets according to pages, which are included in the pages in the slide-in state. For example, the grouping user interface 1512 may be a layer including an image, which allows the icons and/or widgets included in each page to be displayed in group.

Figure 16:
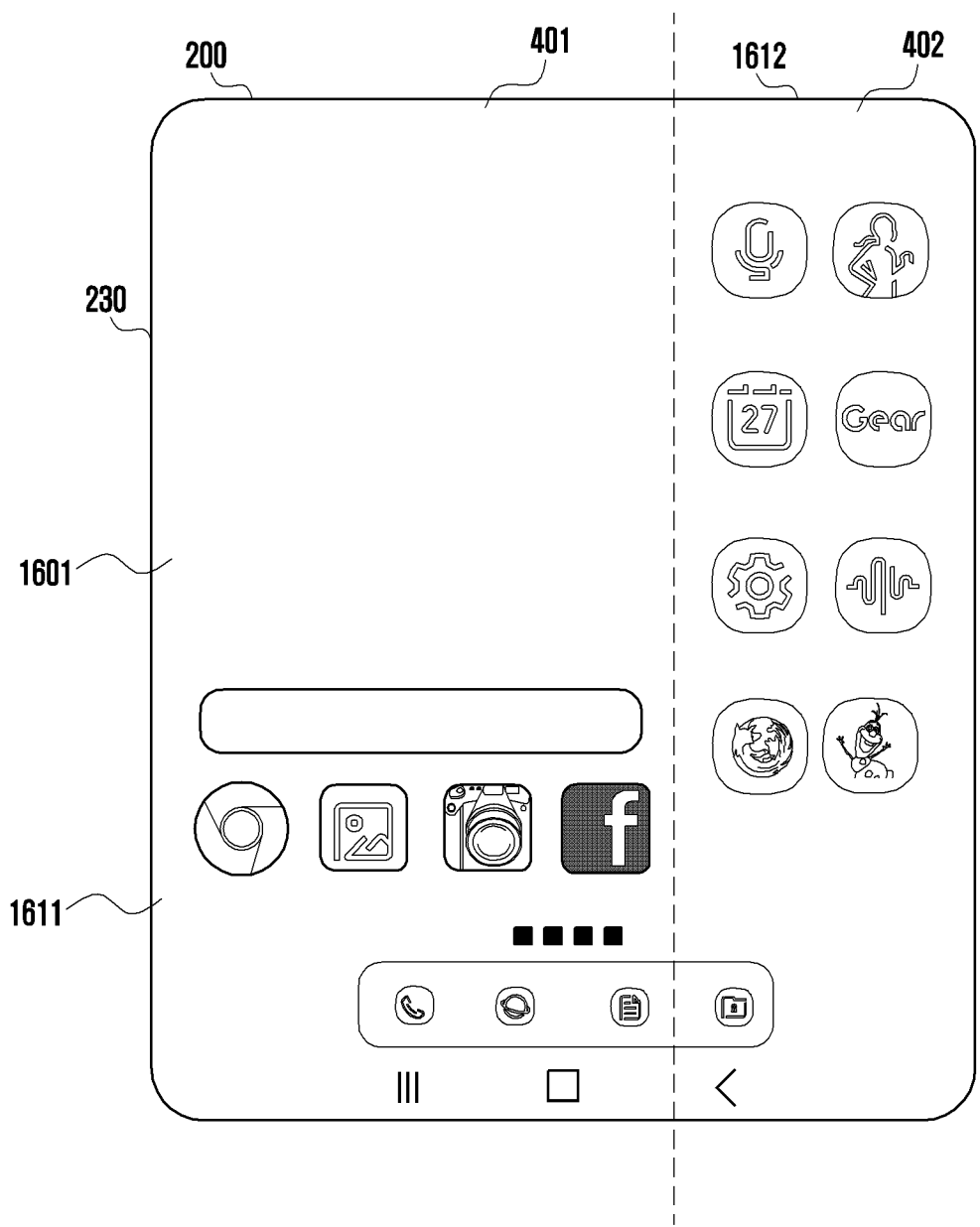
FIG. 16 illustrates a method of a second screen operation when an electronic device is in a slide-out state according to certain embodiments.

FIG. 16 illustrates a method of a second screen operation when the electronic device 200 according to certain embodiments is in a slide-out state.

The electronic device 200 may display a transparent and/or translucent user interface 1612 on the flexible display 230 so that at least a portion of page I+1 displayed in the expansion area 402 can be distinguished from page I displayed in the main area 401.

Figure 17:
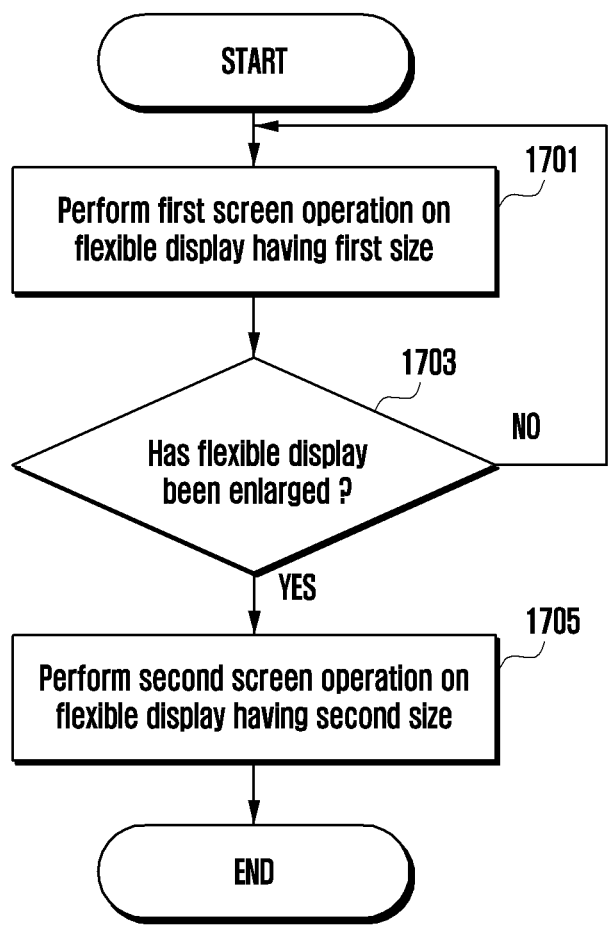
FIG. 17 is a flowchart illustrating a method for operating a screen of an electronic device according to certain embodiments.

FIG. 17 is a flowchart illustrating a method for operating a screen of the electronic device 200 according to certain embodiments.

The electronic device 200 may perform a first screen operation on the flexible display 230 having a first size in operation 1701 under the control of a processor 120. The first size may be, for example, the size corresponding to the slide-in state of the flexible display 230. In the first screen operation, at least one icon, at least one application, at least one item, and/or at least one image may be displayed in the form of a page having a matrix (e.g., M×N matrix) in the main area 401. In certain embodiments, the electronic device 200 may include a plurality of pages. The displayed pages may be varied according to a user input. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The electronic device 200 may determine in operation 1703 under the control of the processor 120 whether the flexible display 230 is enlarged. The electronic device 200 may determine in operation 1703 under the control of the processor 120 whether the electronic device 200 is in the slide-out state. The electronic device 200 may proceed to operation 1705 if the flexible display 230 is enlarged under the control of the processor 120. The electronic device 200 may proceed to operation 1701 if the flexible display 230 is not enlarged under the control of the processor 120. The electronic device 200 may proceed to operation 1705 when the electronic device 200 is in the slide-out state under the control of the processor 120. The electronic device 200 may proceed to operation 1701 when the electronic device 200 is in the slide-in state under the control of the processor 120.

The electronic device 200 may perform a second screen operation on the flexible display 230 having a second size in operation 1705 under the control of the processor 120.

The second size may be the size including the main area 401 and/or the expansion area 402 when the flexible display 230 is slid out. In the second screen operation, at least one icon, at least one application, at least one item, and/or at least one image may be displayed in the form of a page having a matrix (e.g., M×(N+L) matrix). The electronic device 200 may include page I, page I+1, and page I+2, which can be displayed on the flexible display 230 in the slide-in state, but not simultaneously. In the slide-out state, the electronic device 200 may display at least a portion of page I+2, page I+1, and page I on the flexible display 230 on one page through the second screen operation. In this case, a user interface capable of distinguishing pages may be displayed also.

Figure 18:
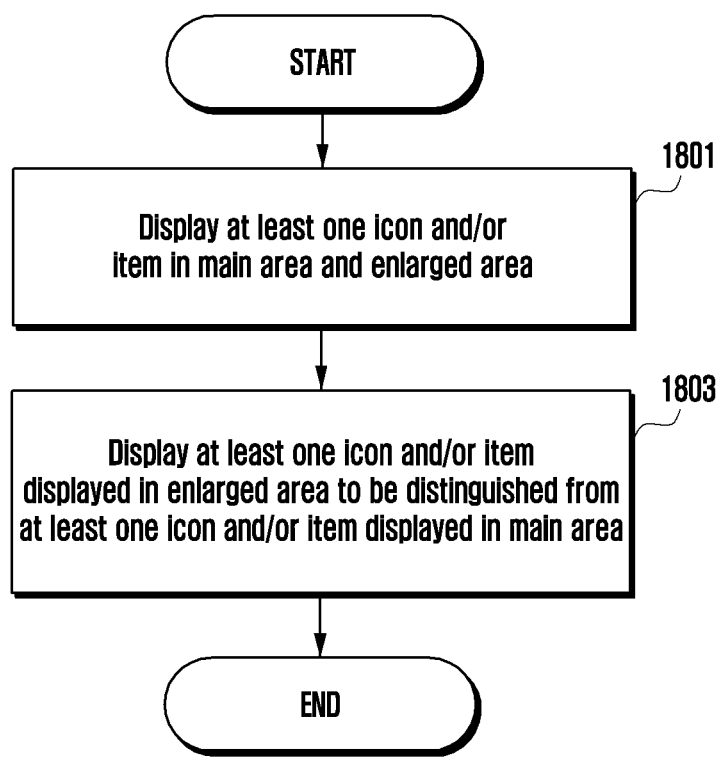
FIG. 18 is a flowchart illustrating a method of a second screen operation in an electronic device according to certain embodiments.

FIG. 18 is a flowchart illustrating a method of a second screen operation in the electronic device 200 according to certain embodiments.

The electronic device 200 may display at least one icon and/or widget in the main area 401 and the expansion area 402 in operation 1801 under the control of the processor 120.

The electronic device 200 may display at least one icon and/or widget displayed in the expansion area 402 in operation 1803 under the control of the processor 120 to be distinguished from at least one icon and widget displayed in the main area 401. The operation of displaying at least one icon and/or widget displayed in the expansion area 402 to be distinguished from at least one icon and/or widget displayed in the main area 401 may include displaying at least one of the grouping user interface 1101, the transparent, and/or translucent user interface 1121, the user interface 1122 for border line, the user interface 1123 for sub indicator, the user interfaces 1124 and 1125 for numbering guide, and user interfaces 1126 and 1127 for page indicator.

Figure 19:
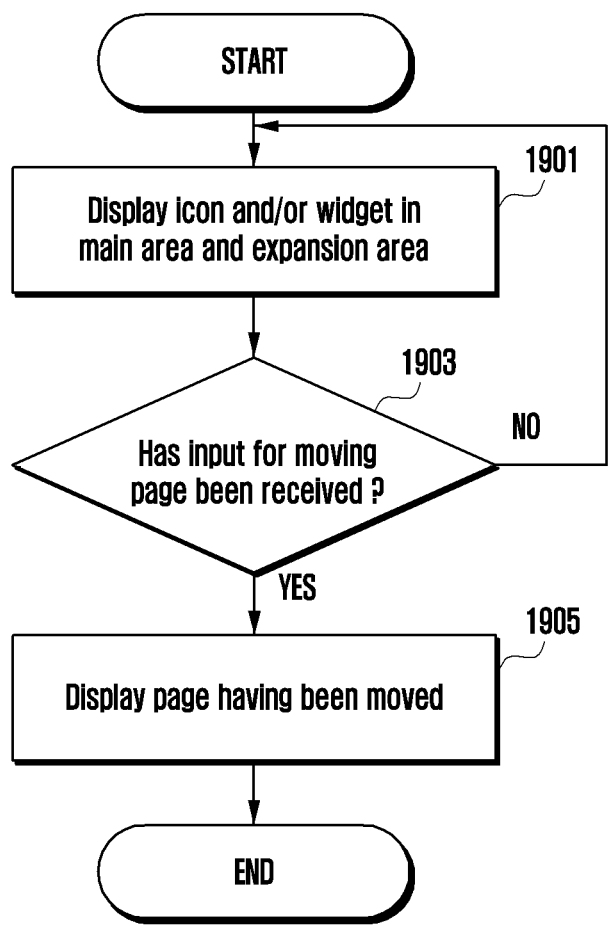
FIG. 19 is a flowchart illustrating a method of a second screen operation in an electronic device according to certain embodiments.

FIG. 19 is a flowchart illustrating a method of a second screen operation in the electronic device 200 according to certain embodiments.

The electronic device 200 may display at least one icon and/or widget in the main area 401 and the expansion area 402 in operation 1901 under the control of the processor 120 when the electronic device 200 is in the slide-out state.

In certain embodiments, the electronic device 200 may display page I in the main area 401 and display at least some of icons and/or widgets included in page I+1 in the expansion area 402.

The electronic device 200 may determine in operation 1903 under the control of the processor 120 whether a user input for moving a page is received onto the flexible display 230 when the electronic device 200 is in the slide-out state. The user input for moving a page may be a user input for moving a page to a next page or a previous page.

If there is no user input for moving a page, the electronic device 200 may proceed to operation 1901.

When a user input for moving a page is received, the electronic device 200 may display a page having been moved onto the flexible display 230 in operation 1905. The page may display, for example, the next page and/or the previous page.

For example, if a user input for moving the page to the next page is received while page I is displayed in the main area 401 and at least some of icons and/or widgets included in page I+1 is displayed in the expansion area 402, the electronic device 200 may display page I+1 in the main area 401 and display at least some of icons and/or widgets included in page I+2 in the expansion area 402.

For example, if a user input for moving the page to the previous page is received while page I is displayed in the main area 401 and at least some of icons and/or widgets included in page I+1 in the expansion area 402, the electronic device 200 may display page I−1 in the main area 401 and display at least some of icons and/or widgets included in page I in the expansion area 402.

The electronic device 200 may include: the housing 210; the flexible display 230 which can be slid out from an inner space of the housing 210; and the processor 120. When the flexible display 230 is slid out, the flexible display 230 may be expanded from a first size corresponding to the size of the main area 401 to a second size larger than the first size. For example, the first size may correspond to the main area 401, and the second size may include the main area 401 and at least a portion of the expansion area 402.

The electronic device 200 may control the first screen operation on the flexible display 230 having the first size, under the control of the processor 120. For example, the controlling the first screen operation by the electronic device 200 under the control of the processor 120 may be an operation of displaying a first icon group in the main area 401. Referring to FIGS. 4A to 4D, the controlling the first screen operation by the electronic device 200 under the control of the processor 120 may be an operation of displaying the first page 411, the second page 412, the third page 413, or the fourth page 414 in the main area 401. The first icon group may include a plurality of icons included on the first page 411, the second page 412, the third page 413, and/or the fourth page 414.

Under the control of the processor 120, the electronic device 200 may determine whether the flexible display 230 is slid out and may control a second screen operation on the flexible display 230 having a second size when the flexible display 230 is slid out. For example, the controlling the second screen operation under the control of the processor 120 by the electronic device 200 may be an operation of displaying a first icon group in the main area 401 and displaying a second icon group in at least a portion of the expansion area 402. Referring to FIGS. 5A to 5D, the controlling the second screen operation under the control of the processor 120 by the electronic device 200 may be an operation of displaying the fifth page 511, the sixth page 512, the seventh page 513, and/or the eighth page 514 in the main area 401 and at least a portion of the expansion area 402. Referring to FIGS. 11A to 11F, the controlling the second screen operation under the control of the processor 120 by the electronic device 200 may be an operation of displaying pages 1111, 1112, 1113, 1114, 1115, and 1116, which displays page I in the main area 401 and displays at least some of icons included in page I+1 in the expansion area 402. The second icon group may be displayed in at least a portion of the expansion area 402 of the flexible display 230.

When the electronic device 200 controls the first screen operation under the control of the processor 120, the electronic device 200 may display a first icon group included on a first page on the flexible display 230 under the control of the processor 120. For example, the first page may be a page displayed in the main area 401.

When the electronic device 200 controls the second screen operation under the control of the processor 120, the electronic device 200 may control under the control of the processor 120 such that a first icon group and a second icon group including only a subset of the plurality of icons included on a second page are displayed on the flexible display 230 and a user interface is displayed to allow the first icon group and the second icon group to be visually different from each other. For example, the second page may be a page displayed in at least a portion of the expansion area 402.

The user interface may include at least one of a grouping user interface 1101, a transparent and/or translucent user interface 1121, a user interface 1122 for a border line, a user interface 1123 for a sub indicator, user interfaces 1124 and 1125 for a numbering guide, and/or a user interface 1126 for a page indicator.

The electronic device 200 may include: the housing 210; the flexible display 230 which can be slid out from an inner space of the housing 210; and the processor 120. When the flexible display 230 is slid out, the flexible display 230 may be expanded from a first size corresponding to the size of the main area 401 to a second size larger than the first size. The processor 120 may control a first screen operation on the flexible display 230 having the first size, determine whether the flexible display 230 is slid out, control a second screen operation on the flexible display 230 having the second size when the flexible display 230 is slid out, cause to display a first icon group included on a first page when controlling the first screen operation, and when controlling the second screen operation, cause display of the first icon group and a second icon group including only a subset of icons included on a second page and cause display of a user interface to allow the first icon group and the second icon group to be visually different from each other. The user interface may include at least one of the grouping user interface 1101, the transparent and/or translucent user interface 1121, the user interface 1122 for a border line, the user interface 1123 for a sub indicator, the user interfaces 1124 and 1125 for a numbering guide, and/or the user interface 1126 for a page indicator.

The second size in the electronic device 200 may include the main area 401 and at least a portion of the expansion area 402.

The electronic device 200 may control the first screen operation under the control of the processor 120 such that at least one icon, at least one application, at least one item, and/or at least one image is displayed on the first page and/or the second page in a matrix form.

The electronic device 200 may control the second screen operation under the control of the processor 120 such that the first page is displayed in the main area 401 and the subset of icons included on the second page is displayed in the expansion area 402.

The electronic device 200 may control the second screen operation under the control of the processor 120 such that if the second page is the last page, the second page is displayed in the main area 401 and a blank page is displayed in the expansion area 402.

The electronic device 200 may control the second screen operation under the control of the processor 120 such that if the second page is the last page, the second page is displayed in the main area 401 and at least some of icons included on the first page is displayed in the expansion area 402.

The electronic device 200 may control the second screen operation under the control of the processor 120 such that the at least one icon, the at least one application, the at least one item, and/or the at least one image included on the first page is expanded or moved to be displayed in the main area 401 and/or the expansion area 402.

The electronic device 200 may control the second screen operation under the control of the processor 120 such that the at least one icon, the at least one application, the at least one item, and/or the at least one image included on the second page is deleted or reduced to be displayed in the expansion area 402.

The electronic device 200 may control the first screen operation under the control of the processor 120 when the flexible display 230 is slid in during the second screen operation.

A method for operating a screen of the electronic device 200 including the flexible display 230 which can be slid out from an inner space of the housing 210 may include: controlling a first screen operation on the flexible display 230 having a first size, where the first size corresponding to the size of the main area 401 can be expanded to a second size larger than the first size when the flexible display 230 is slid out; determining whether the flexible display 230 is slid out; and controlling a second screen operation on the flexible display 230 having the second size when the flexible display 230 is slid out. The controlling of the first screen operation may include displaying a first icon group included on a first page, and the controlling of the second screen operation may include displaying the first icon group and a second icon group including only a subset of icons included on a second page, and displaying a user interface to allow the first icon group and the second icon group to be visually different from each other. The user interface may include at least one of the grouping user interface 1101, the transparent and/or translucent user interface 1121, the user interface 1122 for a border line, the user interface 1123 for a sub indicator, the user interfaces for a numbering guide, and/or the user interface 1126 for a page indicator.

In the method for operating the screen of the electronic device 200, the second size may include the main area 401 and at least a portion of the expansion area 402.

In the method for operating the screen of the electronic device 200, the controlling of the first screen operation may include displaying at least one icon, at least one application, at least one item, and/or at least one image on the first page and/or the second page in a matrix form.

In the method for operating the screen of the electronic device 200, the controlling of the second screen operation may include displaying the first page in the main area 401 and displaying the subset of icons included on the second page in expansion area 402.

In the method for operating the screen of the electronic device 200, the controlling of the second screen operation may include displaying the second page in the main area 401 and displaying a blank page in the expansion area 402 if the second page is a last page.

In the method for operating the screen of the electronic device 200, the controlling of the second screen operation may include displaying the second page in the main area 401 and displaying at least some of icons included on the first page in the expansion area 402 if the second page is the last page.

In the method for operating the screen of the electronic device 200, the controlling of the second screen operation may include expanding or moving the at least one icon, the at least one application, the at least one item, and/or the at least one image included on the first page to display the same in the main area 401 and/or the expansion area 402.

In the method for operating the screen of the electronic device 200, the controlling of the second screen operation may include deleting or reducing the at least one icon, the at least one application, the at least one item, and/or the at least one image included on the second page to display the same in the expansion area 402.

In the method for operating the screen of the electronic device 200, the controlling of the first screen operation may include controlling the first screen operation when the flexible display 230 is slid in during the second screen operation.

The electronic device according to certain embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device, comprising:
a housing;
a memory;
a flexible display which can be extended out from an inner space of the housing,
wherein when the flexible display is extended, the flexible display is expanded from a first size corresponding to a size of a main area, to a second size larger than the first size; and
a processor operatively coupled to the flexible display and the memory, wherein the processor is configured to:
store, in the memory, information related to a first page including a first icon group and a second page to be arranged in a sequential order on the flexible display,
control a first screen operation on the flexible display, the first screen having the first size and including the first page,
in response to detecting extending of the flexible display, control a second screen operation on the flexible display, the second screen having the second size,
if the flexible display is fully extended to the second size:
control the flexible display to display the first page, and a portion of the second page subsequent to the first page in the sequential order, including a subset of a second icon group included in the second page,
control the flexible display to display the first icon group and the second icon group to be visually different from each other, using at least one of a transparent and/or translucent effect on the second icon group, a border line on at least one icon included in the second icon group, or a sub indicator on at least one icon included in the second icon group, and
in response to detecting a drag input to the flexible display, remove the first page from display, and display the second page to an area from which the first page is removed including an entirety of the icons included on the second page.

2. The electronic device of claim 1, wherein the second size includes the main area and at least a portion of an expansion area, and
wherein removing the first page from display and displaying the second page to the area from which the first page is removed further includes retrieving, according to the sequential order, a third page, and, while the flexible display is fully extended, displaying a portion of the third page including a subset of a third icon group of the third page proximate to the displayed second page.

3. The electronic device of claim 2, wherein the processor is further configured to control the first screen operation such that at least one icon, at least one application, at least one item, and/or at least one image is displayed on the first page and/or the second page in a matrix form.

4. The electronic device of claim 3, wherein the processor is further configured to control the second screen operation such that the first page is displayed in the main area and the subset of the second icon group included on the second page are displayed in the expansion area.

5. The electronic device of claim 4, wherein the processor is further configured to control the second screen operation such that if the second page is a last page, the second page is displayed in the main area and a blank page is displayed in the expansion area.

6. The electronic device of claim 4, wherein the processor is further configured to control the second screen operation such that if the second page is a last page, the second page is displayed in the main area and at least some of icons included on the first page are displayed in the expansion area.

7. The electronic device of claim 3, wherein the processor is further configured to control the second screen operation such that the at least one icon, the at least one application, the at least one item, and/or the at least one image included on the first page is expanded or moved to be displayed in the main area and/or the expansion area.

8. The electronic device of claim 3, wherein the processor is further configured to control the second screen operation such that the at least one icon, the at least one application, the at least one item, and/or the at least one image included on the second page is deleted or reduced to be displayed in the expansion area.

9. The electronic device of claim 1, wherein the processor is further configured to control the first screen operation when the flexible display is slid in during the second screen operation.

10. A method for operating a screen of an electronic device including a flexible display, the method comprising:
storing, in a memory, information related to a first page including a first icon group and a second page to be arranged in a sequential order on the flexible display;
controlling a first screen operation on the flexible display, the first screen having a first size and including a first page having a first icon group;
in response to detecting extending of the flexible display, controlling a second screen operation on the flexible display, the second screen having a second size;
if the flexible display is fully extended to the second size:
displaying the first page, and a portion of the second page subsequent to the first page in the sequential order, including a subset of a second icon group included in the second page, and wherein the first icon group and the second icon group are displayed visually different from each other, using at least one of: a transparent and/or translucent effect on the second icon group, a border line on at least one icon included in the second icon group, or a sub indicator on at least one icon included in the second icon group; and in response to detecting a drag input to the flexible display, remove the first page from display, and display the second page to an area from which the first page is removed including an entirety of the icons included on the second page.

11. The method for operating the screen of the electronic device of claim 10, wherein the second size includes the a main area and at least a portion of an expansion area; and wherein removing the first page from display and displaying the second page to the area from which the first page is removed further includes retrieving, according to the sequential order, a third page, and, while the flexible display is fully extracted, displaying a portion of the third page including a subset of icons of the third page proximate to the displayed second page including the entirety of the icons included on the second page.

12. The method for operating the screen of the electronic device of claim 11, wherein the controlling of the first screen operation further comprises displaying at least one icon, at least one application, at least one item, and/or at least one image on a first page and/or a second page in a matrix form.

13. The method for operating the screen of the electronic device of claim 12, wherein the controlling of the second screen operation further comprises displaying the first page in the main area and displaying the subset of icons included on the second page in expansion area.

14. The method for operating the screen of the electronic device of claim 13, wherein the controlling of the second screen operation further comprises displaying the second page in the main area and displaying a blank page in the expansion area if the second page is a last page.

15. The method for operating the screen of the electronic device of claim 13, wherein the controlling of the second screen operation further comprises displaying the second page in the main area and displaying at least some of icons included on the first page in the expansion area if the second page is a last page.

16. The method for operating the screen of the electronic device of claim 12, wherein the controlling of the second screen operation further comprises expanding or moving the at least one icon, the at least one application, the at least one item, and/or the at least one image included on the first page to be displayed in the main area and/or the expansion area.

17. The method for operating the screen of the electronic device of claim 12, wherein the controlling of the second screen operation further comprises deleting or reducing the at least one icon, the at least one application, the at least one item, and/or the at least one image included on the second page to be displayed in the expansion area.

18. The method for operating the screen of the electronic device of claim 10, wherein the controlling of the first screen operation further comprises controlling the first screen operation when the flexible display is slid in during the second screen operation.

* * * * *